United States Patent
Okada et al.

(10) Patent No.: US 11,447,663 B2
(45) Date of Patent: Sep. 20, 2022

(54) ADHESIVE LAYER, NEAR-INFRARED ABSORBING FILM, LAMINATED STRUCTURE, LAMINATION BODY, ADHESIVE COMPOSITION AND METHOD FOR PRODUCING THE SAME

(71) Applicant: SUMITOMO METAL MINING CO., LTD., Tokyo (JP)

(72) Inventors: Mika Okada, Isa (JP); Hirofumi Tsunematsu, Isa (JP); Takeshi Chonan, Isa (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 24 days.

(21) Appl. No.: 16/647,716

(22) PCT Filed: Sep. 14, 2018

(86) PCT No.: PCT/JP2018/034175
§ 371 (c)(1),
(2) Date: Mar. 16, 2020

(87) PCT Pub. No.: WO2019/054479
PCT Pub. Date: Mar. 21, 2019

(65) Prior Publication Data
US 2020/0369923 A1    Nov. 26, 2020

(30) Foreign Application Priority Data
Sep. 14, 2017 (JP) .............................. JP2017-176410

(51) Int. Cl.
| C09J 7/29 | (2018.01) |
| C09J 7/38 | (2018.01) |
| C09J 11/04 | (2006.01) |
| C09J 11/08 | (2006.01) |
| C09J 133/08 | (2006.01) |
| B32B 7/12 | (2006.01) |
| B32B 27/36 | (2006.01) |
| B32B 27/08 | (2006.01) |
| B32B 17/06 | (2006.01) |

(52) U.S. Cl.
CPC ................ *C09J 7/29* (2018.01); *B32B 7/12* (2013.01); *B32B 27/08* (2013.01); *B32B 27/36* (2013.01); *C09J 7/385* (2018.01); *C09J 11/04* (2013.01); *C09J 11/08* (2013.01); *C09J 133/08* (2013.01); *B32B 2255/10* (2013.01); *B32B 2307/412* (2013.01); *C09J 2433/00* (2013.01)

(58) Field of Classification Search
CPC .................................... C08K 9/04; C08K 9/06
See application file for complete search history.

(56) References Cited

U.S. PATENT DOCUMENTS

| 6,376,077 B1* | 4/2002 | Hiraishi | .................. C09C 3/10 |
| | | | 428/403 |
| 2005/0014004 A1* | 1/2005 | King | .................. C09D 163/00 |
| | | | 428/413 |
| 2017/0334735 A1 | 11/2017 | Machida et al. | |
| 2018/0016451 A1 | 1/2018 | Okada et al. | |
| 2018/0208803 A1 | 7/2018 | Okada et al. | |
| 2019/0002712 A1 | 1/2019 | Tsunematsu et al. | |
| 2019/0225503 A1* | 7/2019 | Okada | .............. B32B 17/10614 |

FOREIGN PATENT DOCUMENTS

| EP | 3252117 A1 | 12/2017 |
| EP | 3666846 A1 | 6/2020 |
| JP | H08-281860 A | 10/1996 |
| JP | 2008-26492 A | 2/2008 |
| JP | 2009035615 A * | 2/2009 |
| JP | 2011-063740 A | 3/2011 |
| JP | 2013-173642 A | 9/2013 |
| JP | 5338099 B2 | 11/2013 |
| JP | 5692499 B2 | 4/2015 |
| JP | 2015-105325 A | 6/2015 |
| JP | 2015-105328 A | 6/2015 |
| JP | 2017-155112 A | 9/2017 |
| KR | 10-2017-0064536 A | 6/2017 |
| WO | 2008/059995 A1 | 5/2008 |
| WO | 2016/121845 A1 | 8/2016 |
| WO | 2017/073691 A1 | 5/2017 |
| WO | 2017/094909 A1 | 6/2017 |
| WO | 2017/104855 A1 | 6/2017 |

OTHER PUBLICATIONS

Oct. 30, 2018 Search Report issued in International Patent Application No. PCT/JP2018/034175.
Aug. 27, 2021 Extended European Search Report issued in European Patent Application No. 18855252.5.

* cited by examiner

*Primary Examiner* — Cheng Yuan Huang
(74) *Attorney, Agent, or Firm* — Oliff PLC

(57) ABSTRACT

An adhesive composition layer that transmits light in a visible light region and absorbs light in a near-infrared region, has a low haze value, and a near-infrared absorbing film, a laminated structure, a laminated body using the above adhesive composition and adhesive layer, and an adhesive layer, a near-infrared absorbing film, a laminated structure, a laminated body, and an adhesive composition containing composite tungsten oxide fine particles, a dispersant, a metal coupling agent having an amino group, an adhesive, and a crosslinking agent, wherein the composite tungsten oxide fine particles include a hexagonal crystal structure, and the composite tungsten oxide fine particles have lattice constant values such as 7.3850 Å or more and 7.4186 Å or less on the a-axis, and 7.5600 Å or more and 7.6240 Å or less on the c-axis, and the composite tungsten oxide fine particles having an average particle size of 100 nm or less.

26 Claims, 3 Drawing Sheets

ADHESIVE LAYER, NEAR-INFRARED ABSORBING FILM, LAMINATED STRUCTURE, LAMINATION BODY, ADHESIVE COMPOSITION AND METHOD FOR PRODUCING THE SAME

TECHNICAL FIELD

The present invention relates to an adhesive layer, a near-infrared absorbing film, a laminated structure, a laminated body, an adhesive composition, and a method for producing the same.

DESCRIPTION OF RELATED ART

A near-infrared absorbing layer capable of shielding a part of a solar energy that enters cars or buildings and reducing a cooling load, human feeling of heat, and an adverse effects on plants, is required for window materials such as automobiles and buildings, and films for greenhouses, and various studies are underway. Further, use of the near-infrared absorbing layer as an infrared absorbing filter in display panels and camera modules is also being studied.

On the other hand, it has been proposed to attach the near-infrared absorbing film (a transparent film with an adhesive layer) to the windows or the like, as a method for imparting near-infrared absorbing ability to the existing windows, etc.

Patent Document 1 discloses a heat ray absorbing film including a heat ray absorbing layer, an adhesive layer, and a hard coat layer, with a front surface made of the hard coat layer, and a back surface made of the adhesive layer, as an example of the near-infrared absorbing film. Patent Document 1 also discloses that the hard coat layer doubles as the heat ray absorbing layer, the heat ray absorbing layer contains heat ray absorbing inorganic fine particles, and antimony-containing tin oxide fine particles (ATO) and indium-containing tin oxide fine particles (ITO) are used as the heat ray absorbing inorganic fine particles.

Further, Patent Document 2 discloses an anti-reflection film which is a laminated body sequentially including: (A) a hard coat layer having a thickness of 2 to 20 µm containing a resin cured by irradiation with active energy rays, and a near-infrared ray absorbent; and (B) a low-refractive-index layer having a refractive index of 1.43 or less and a thickness of 50 to 200 nm, containing a cured resin obtained by irradiation with active energy rays. Also, Patent Document 2 discloses that in the anti-reflection film, an adhesive layer can be formed on the surface of a substrate film on the opposite side of the hard coat layer.

Patent Document 3 discloses a transparent resin composition containing a crosslinkable compound, an additive having a high amine value, and inorganic particles, and also discloses that the inorganic particles contain one or more metal composite oxides selected from the group of antimony-added tin oxide, tin-added indium oxide, cesium-added tungsten oxide, aluminum-doped zinc oxide, gallium-doped zinc oxide and niobium-doped titanium oxide, and also discloses a heat ray absorbing film obtained by forming a coating layer on a substrate using a transparent resin composition.

Patent Document 4 discloses a transparent resin composition containing crosslinkable compound and inorganic particles, wherein the inorganic particles contain a metal composite oxide of one or two or more selected from the group of antimony-added tin oxide, tin-added indium oxide, cesium-added tungsten oxide, aluminum-added zinc oxide, gallium-doped zinc oxide and niobium-doped titanium oxide, and the surface of the inorganic particles is modified with an organic compound having an organic group containing one or both of an acryloyl group and a methacryloyl group, and also discloses a heat ray absorbing film formed by forming a coating layer on a substrate using a transparent resin composition.

Further, Patent Document 5 discloses an adhesive composition containing a tungsten oxide-based compound having a predetermined average particle size, metal oxide fine particles and resin, and also discloses a near-infrared absorbing filter having an adhesive layer including an adhesive composition on a substrate.

Patent Document 6 discloses an infrared adhesive layer-forming dispersion liquid in which infrared absorbing material fine particles composed of one or more oxide fine particles selected from tungsten oxide fine particles and composite tungsten oxide fine particles are dispersed in a solvent, and phosphorous antioxidant is contained in the solvent together with the infrared absorbing material fine particles, and also discloses that (meth) acrylic polymer and a crosslinking agent are added to the infrared absorbing adhesive layer-forming dispersion liquid, and also discloses an infrared absorbing adhesive layer obtained by coating a first substrate surface of a plasma display panel multilayer filter with an infrared absorbing adhesive layer-forming coating liquid to form a coating layer, and applying an aging treatment to the coating layer, and also discloses an infrared absorbing optical member composed of a first substrate and an infrared absorbing adhesive layer formed on the first substrate surface.

PRIOR ART DOCUMENT

Patent Document

[Patent Document 1] Japanese Patent Application Laid-Open No. 8-281860
[Patent Document 2] Japanese Patent Application Laid-Open No. 2008-26492
[Patent Document 3] Japanese Patent Application Laid-Open No. 2015-105325
[Patent Document 4] Japanese Patent Application Laid-Open No. 2015-105328
[Patent Document 5] Japanese Patent No. 5338099
[Patent Document 6] Japanese Patent No. 5692499

SUMMARY OF THE INVENTION

Problem to be Solved by the Invention

However, according to a study by the present inventors, in a heat ray absorbing film disclosed in Patent Document 1, ATO, ITO, or the like is used as heat ray absorbing inorganic fine particles, and near-infrared absorption properties were not sufficient.

On the other hand, in Patent Document 2, a coating layer containing a near-infrared absorbing agent is formed on a substrate. Therefore, the obtained anti-reflection film has a configuration in which the near-infrared absorbing agent is exposed to the air. Then, a problem is that when a tungsten oxide compound used as a near-infrared absorber is exposed to the air for a long time, the near-infrared absorption properties may decrease due to fading by oxidation.

Patent Documents 3 and 4 provide antimony-doped tin oxide, tin-doped indium oxide, cesium-doped tungsten oxide, aluminum-doped zinc oxide, gallium-doped zinc oxide and niobium-doped titanium oxide. However, only an example using ATO or ITO is disclosed as examples. Accordingly, similarly to the case of Patent Document 1, the near-infrared absorption properties of the specifically disclosed heat ray absorbing film were not sufficient.

Further, in the heat ray absorbing films disclosed in Patent Documents 3 and 4, a coating layer is formed on a substrate using a transparent resin composition containing the inorganic particles, and there was a problem that the inorganic particles were exposed to the atmosphere as in Patent Document 2.

Here. Patent Documents 5 and 6 disclose that tungsten oxide fine particles and composite tungsten oxide fine particles are contained in an adhesive layer, and therefore exposure of these materials to the air has been reduced, making it less prone to oxidative fading.

However, according to the study by the present inventors, it is found that the adhesive compositions prepared by the methods disclosed in Patent Documents 5 and 6 may become cloudy or gel in a few hours after preparation.

When stability of the adhesive composition is poor, it is necessary to use the adhesive composition immediately after preparation. Accordingly, there was a problem in terms of productivity. Further, when the adhesive layer is formed using the adhesive composition, there was a problem that a haze value of the formed adhesive layer becomes high. Also, the cloudy or gelled adhesive composition must be discarded, which is a problem in production cost.

The present invention has been made in view of the above-described problems of the related art, and an object of the present invention is to provide an adhesive layer, a near-infrared absorbing film, a laminated structure, a laminated body, an adhesive composition that transmit light in a visible light region and has an ability to absorb light in a near-infrared region, has a low haze value, and is excellent in stability, and provided a method for producing the same.

Means for Solving the Problem

As a result of studies by the present inventors to solve the above problems, an adhesive layer is found, containing composite tungsten oxide fine particles having lattice constant values such as 7.3850 Å or more and 7.4186 Å or less on the a-axis, and 7.5600 Å or more and 7.6240 Å or less on the c-axis, a dispersant, a metal coupling agent having an amino group, an adhesive, and a crosslinking agent. Thus, the present invention is completed.

Namely, in order to solve the above-described problems, a first invention provides an adhesive layer containing composite tungsten oxide fine particles, a dispersant, a metal coupling agent having an amino group, an adhesive, and a crosslinking agent, the composite tungsten oxide fine particles having lattice constant values on a-axis and c-axis such as 7.3850 Å or more and 7.4186 Å or less on the a-axis, and 7.5600 Å or more and 7.6240 Å or less on the c-axis, and the composite tungsten oxide fine particles having an average particle size of 100 nm or less.

A second invention provides the adhesive layer of the first invention, wherein the lattice constant of the composite tungsten oxide fine particles is 7.4031 Å or more and 7.4111 Å or less on the a-axis, and 7.5891 Å or more and 7.6240 Å or less on the c-axis.

A third invention provides the adhesive layer according to the first or second invention, wherein the composite tungsten oxide fine particles are represented by a general formula $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, W is tungsten, O is oxygen, satisfying $0.001 \leq x/y \leq 1$, $2.0 \leq z/y \leq 3.0$).

A fourth invention provides the adhesive layer according to any one of the first to third inventions, wherein the composite tungsten oxide fine particles include a composite tungsten oxide having a hexagonal crystal structure.

A fifth invention provides the adhesive layer according to any one of the first to fourth inventions, wherein an average particle size of the composite tungsten oxide fine particles is 10 nm or more and 100 nm or less.

A sixth invention provides the adhesive layer according to any one of the first to fifth inventions, wherein a crystallite size of the composite tungsten oxide fine particles is 10 nm or more and 100 nm or less.

A seventh invention provides the adhesive layer according to any one of the first to sixth inventions, wherein at least a part of a surface of the composite tungsten oxide fine particles is coated with a surface coating layer containing at least one element selected from Si, Ti, Zr, and Al.

An eighth invention provides the adhesive layer according to the seventh invention, wherein the surface coating layer contains oxygen atoms.

A ninth invention provides the adhesive layer according to any one of the first to eighth inventions, wherein a metal coupling agent having an amino group is contained at a ratio of 1 part by mass or more and 100 parts by mass or less, based on 100 parts by mass of the composite tungsten oxide fine particles.

A tenth invention provides the adhesive layer according to any one of the first to ninth inventions, wherein the metal coupling agent having an amino group is a silane coupling agent having an amino group.

An eleventh invention provides the adhesive layer according to any one of the first to ninth inventions, wherein the metal coupling agent having an amino group is a titanate-based coupling agent having an amino group.

A twelfth invention provides the adhesive layer according to any one of the first to eleventh inventions, wherein the adhesive contains an acrylic polymer.

A thirteenth invention provides the adhesive layer according to any one of the first to twelfth inventions, wherein the dispersant is a polymer dispersant.

A fourteenth invention provides the adhesive layer according to any one of the first to thirteenth inventions, further containing one or more kinds selected from ultraviolet absorbers, HALS, and antioxidants.

A fifteenth invention provides a near-infrared absorbing film including the adhesive layer according to any one of the first to fourteenth inventions.

A sixteenth invention provides a near-infrared absorbing film, wherein the adhesive layer according to any one of the first to fourteenth inventions is disposed on one surface side of a transparent film, and a hard coat layer is disposed on the other surface side of the transparent film.

A seventeenth invention provides a laminated structure, including:
multiple transparent films; and
the adhesive layer according to any one of the first to fourteenth inventions,
wherein the adhesive layer is disposed between the multiple transparent films.

An eighteenth invention provides a laminated structure, including:

a glass plate disposed on one surface of the adhesive layer according to any one of the first to fourteenth inventions;

a transparent film disposed on the other surface of the adhesive layer; and a hard coat layer disposed on the other surface of the transparent film.

a nineteenth invention provides an adhesive composition containing composite tungsten oxide fine particles, a dispersant, a metal coupling agent having an amino group, an organic solvent, an adhesive, and a crosslinking agent, the composite tungsten oxide fine particles having lattice constant values on a-axis and c-axis such as 7.3850 Å or more and 7.4186 Å or less on the a-axis, and 7.5600 Å or more and 7.6240 Å or less on the c-axis, and the composite tungsten oxide fine particles having an average particle size of 100 nm or less.

A twentieth invention provides the adhesive composition according to the nineteenth invention, wherein the lattice constant of the composite tungsten oxide fine particles is 7.4031 Å or more and 7.4111 Å or less on the a-axis, and 7.5891 Å or more and 7.6240 Å or less on the c-axis.

A twenty-first invention provides the adhesive composition according to the nineteenth or twentieth invention, further containing one or more selected from UV absorber, HALS and antioxidant.

A twenty-second invention provides a method for producing the adhesive composition containing composite tungsten oxide fine particles, a dispersant, a metal coupling agent having an amino group, an organic solvent, an adhesive, and a crosslinking agent, the method including:

heat-treating and pulverizing to produce the composite tungsten oxide fine particles to have a lattice constant in a range of 7.3850 Å or more and 7.4186 Å or less on a-axis, and 7.5600 Å or more and 7.6240 Å or less on c-axis; and mixing the dispersant, the metal coupling agent having an amino group, the organic solvent, the adhesive, and the crosslinking agent while maintaining the above-described range of the lattice constant in the composite tungsten oxide fine particles, to obtain an adhesive composition.

A twenty-third invention provides the method for producing the adhesive composition according to the twenty-second invention, wherein the composite tungsten oxide fine particles are fine particles of composite tungsten oxide including a hexagonal crystal structure represented by $M_xW_yO_z$ (where M is one or more elements selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, Yb, W is tungsten, O is oxygen, satisfying $0.001 \leq x/y \leq 1$, $2.2 \leq z/y \leq 3.0$).

A twenty-fourth invention provides the method for producing the adhesive composition according to the twenty-second or twenty-third invention, wherein at least a part of a surface of the composite tungsten oxide fine particles is coated with a surface coating layer containing at least one element selected from Si, Ti, Al and Zr.

A twenty-fifth invention provides the method for producing the adhesive composition according to the twenty-fourth invention, wherein the surface coating layer contains oxygen atoms.

A twenty-sixth invention provides the method for producing the adhesive composition according to any one of the twenty-second to twenty-fifth invention, including:

further mixing at least one selected from UV absorber, HALS and antioxidant.

Advantage of the Invention

According to an aspect of the present invention, there are provided an adhesive composition and an adhesive layer that transmit light in a visible light region and has an ability to absorb light in a near-infrared region, has a low haze value, and is excellent in stability, and are provided a near-infrared absorbing film, a laminated structure, and a laminated body using the adhesive composition and the adhesive layer.

DETAILED DESCRIPTION OF THE INVENTION

Figure 1:
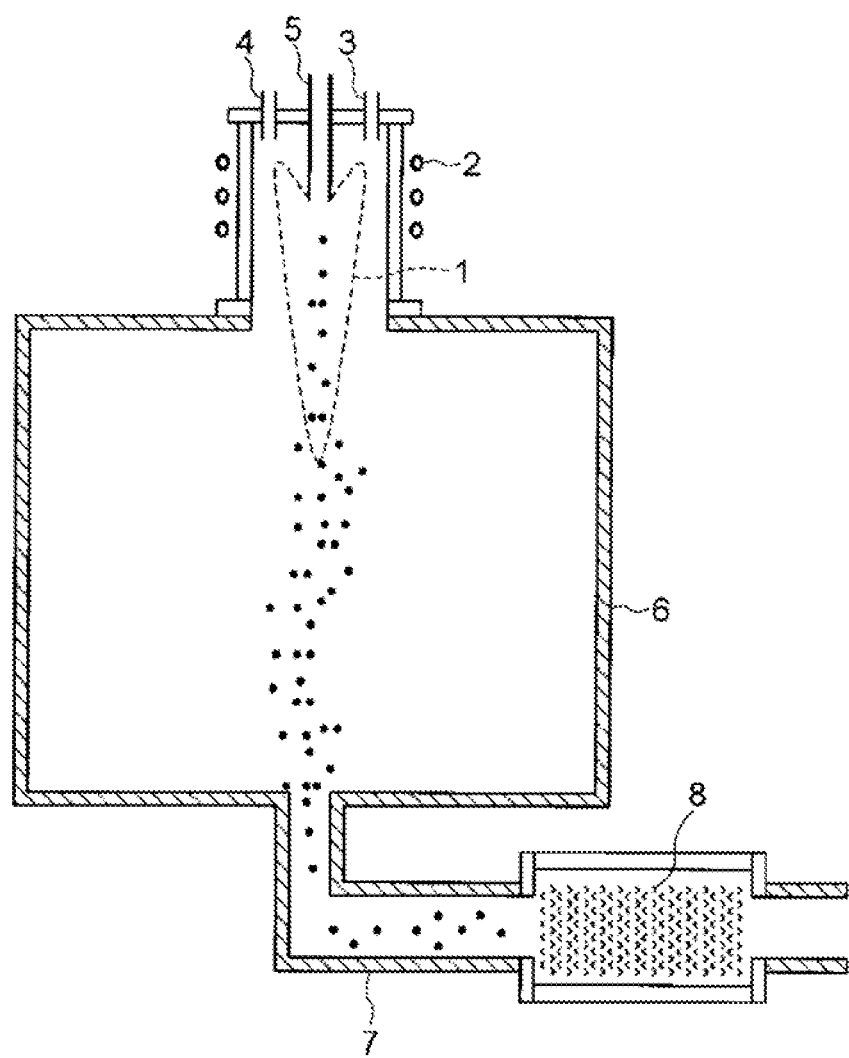
FIG. 1 is a conceptual diagram of a high-frequency plasma reactor used in the present invention.

The present invention relates to an adhesive layer containing composite tungsten oxide fine particles, a dispersant, a metal coupling agent having an amino group, an adhesive, and a crosslinking agent, the containing composite tungsten oxide fine particles having lattice constant values on a-axis and c-axis such as 7.3850 Å or more and 7.4186 Å or less on the a-axis, and 7.5600 Å or more and 7.6240 Å or less on the c-axis, and an infrared absorbing film having the adhesive layer, a laminated structure having the adhesive layer, and an adhesive composition containing the composite tungsten oxide fine particles, the dispersant, the metal coupling agent having an amino group, an organic solvent, an adhesive, and the crosslinking agent, the composite tungsten oxide fine particles having lattice constants of 7.3850 Å or more and 7.4186 Å or less on the a-axis, and 7.5600 Å or more and 7.6240 Å or less on the c-axis.

An embodiment for carrying out the present invention will be described hereafter in an order of [1] an adhesive composition and an adhesive layer. [2] a near-infrared absorbing film, [3] a laminated structure, and [4] a laminated body. Note that the present invention is not limited to the embodiments described below, and various modifications and substitutions can be made without departing from the scope of the present invention.

[1] An Adhesive Composition and an Adhesive Layer

The present inventors have intensively studied on an adhesive layer having an ability to absorb light in the near-infrared region, a low haze value, and excellent productivity.

The adhesive layer according to the present invention is produced from the adhesive composition according to the present invention. Therefore, the present inventors also have intensively studied on a method of suppressing clouding and gelation of the adhesive composition, which is a raw material of the adhesive layer, to keep the adhesive composition stable.

Hereinafter. (A) an adhesive composition and (B) an adhesive layer will be described in this order.

(A) An Adhesive Composition

The adhesive composition according to the present invention is a composition for obtaining an adhesive layer described below, and contains a dispersant, a metal coupling agent having an amino group, an adhesive, a crosslinking agent, and optionally other additive component, in a predetermined solvent composite tungsten oxide fine particles.

As a result of the above study, the present inventors found a configuration in which the adhesive composition contains the metal coupling agent having an amino group together with the composite tungsten oxide fine particles. The adhesive composition containing the metal coupling agent having an amino group could be stored stably together with the composite tungsten oxide fine particles because clouding and gelation were suppressed. In addition, the adhesive layer was manufactured with high productivity from the adhesive composition containing the composite tungsten oxide fine particles and the metal coupling agent having an amino group. It is also found that the produced adhesive layer has an ability to absorb light in the near-infrared region and can suppress haze.

It is not clear why the above-described plurality of excellent effects can be obtained. However, the present inventors consider that by adding the metal coupling agent having an amino group to the adhesive composition and the adhesive layer, the surface of the composite tungsten oxide fine particles was modified by the metal coupling agent having an amino group, and also consider that as a result of the modification, a compatibility between the composite tungsten oxide fine particles and the adhesive was improved.

As a result of the compatibility improvement, it is considered that by uniformly dispersing the composite tungsten oxide fine particles in the adhesive composition and in the adhesive layer, the stability of the adhesive composition was ensured, the haze value of the adhesive layer was reduced, and high productivity of the adhesive layer could be obtained.

The adhesive composition according to this embodiment will be described hereafter in an order of [a] composite tungsten oxide fine particles, [b] a method for synthesizing composite tungsten oxide fine particles. [c] a metal coupling agent having an amino group, [d] an adhesive, [e] a dispersant, a crosslinking agent, other additional component, [f] a solvent, [g] production of an adhesive composition.

[a] Composite Tungsten Oxide Fine Particles

The composite tungsten oxide fine particles according to the present invention are composite tungsten oxide fine particles having near-infrared absorption properties and including a hexagonal crystal structure, and having lattice constants of 7.3850 Å or more and 7.4186 Å or less on a-axis and 7.5600 Å or more and 7.6240 Å or less on c-axis. The value of the ratio related to (lattice constant on c-axis/lattice constant on a-axis) is preferably 1.0221 or more and 1.0289 or less. Further, the composite tungsten oxide fine particles according to the present invention have an average particle size of 100 nm or less.

The composite tungsten oxide fine particles according to the present invention will be described hereafter in an order of (1) crystal structure and lattice constant, (2) particle size and crystallite size, (3) composition of composite tungsten oxide fine particles, (4) surface coating layer of composite tungsten oxide fine particles, (5) summary.

(1) Crystal Structure and Lattice Constant

The composite tungsten oxide fine particles according to the present invention have a structure of tetragonal, cubic tungsten bronze in addition to hexagonal, but any one of these structures is effective as a near-infrared absorbing material. However, an absorption position in the infrared region tends to change depending on the crystal structure. Namely, the absorption position in the near-infrared region tends to shift to a longer wavelength side in the case of the tetragonal crystal rather than the cubic crystal, and tends to shift to further longer wavelength side in the case of the hexagonal crystal rather than the tetragonal crystal. Further, accompanying such a tendency of the absorption position, the light absorption in the visible light region is lowest in the case of the hexagonal crystal, followed by tetragonal crystal, and largest in the case of the cubic crystal.

From the above finding, it is most preferable to use hexagonal tungsten bronze for an application of more transmitting the light in the visible light region and more absorbing the light in the near-infrared region. When the composite tungsten oxide fine particles have a hexagonal crystal structure, the transmittance of the fine particles in the visible light region is improved, and the absorption in the near-infrared region is improved. In this hexagonal crystal structure, a hexagonal void (tunnels) is formed by assembling six hexahedrons formed by units of $WO_6$. Then. M element is arranged in the void to constitute one unit, and a large number of these units gather to form a hexagonal crystal structure.

In order to obtain the effect of the present invention to improve the transmission in the visible light region, and improve the absorption in the near-infrared region, the following configuration is preferable: a unit structure (structure in which six octahedrons formed in $WO_6$ units are assembled to form hexagonal voids, and M elements are arranged in the voids) is included in the composite tungsten oxide fine particles.

When the cation of the element M is present in the hexagonal voids, the absorption in the near-infrared region is improved. Here, generally, the hexagonal crystal is formed when M element having a large ionic radius is added, and specifically, when one or more kinds selected from Cs, Rb, K, Tl, Ba, and In are added, the hexagonal crystal is easily formed, which is preferable.

Further, regarding the composite tungsten oxide fine particles to which at least one element selected from Cs and Rb is added among these M elements having a large ionic radius, it is possible to achieve both absorption in the near-infrared region and transmission in the visible light region.

Note that the hexagonal crystal may be formed, even when two or more kinds of M elements are selected, and one of them is selected from Cs, Rb, K, Tl, Ba, and In, and the other is selected from one or more elements composing the M element.

In the case of Cs tungsten oxide fine particles in which Cs is selected as the M element, the lattice constant of the composite tungsten oxide fine particles is preferably 7.4031 Å or more and 7.4186 Å or less on the a-axis, and 7.5750 Å or more and 7.6240 Å or less on the c-axis, more preferably 7.4031 Å or more and 7.4111 Å or less on the a-axis, and 7.5891 Å or more and 7.6240 Å or less on the c-axis.

In the case of Rb tungsten oxide fine particles in which Rb is selected as the M element, the lattice constant of the composite tungsten oxide fine particles is preferably 7.3850 Å or more and 7.3950 Å or less on the a-axis, and 7.5600 Å or more and 7.5700 Å or less on the c-axis.

In the case of CsRb tungsten oxide fine particles in which Cs and Rb are selected as M elements, the lattice constant of the composite tungsten oxide fine particles is preferably 7.3850 Å or more and 7.4186 Å or less on the a-axis, and 7.5600 Å or more and 7.6240 Å or less on the c-axis.

However, the M element is not limited to the above Cs and Rb. Even if the M element is an element other than Cs and Rb, it may be present as an additional M element in the hexagonal void formed by $WO_6$ units.

When the composite tungsten oxide fine particles having the hexagonal crystal structure according to the present invention are represented by the general formula $M_xW_yO_z$, and when the composite tungsten oxide fine particles have a uniform crystal structure, an added amount of the additional M element is $0.001 \leq x/y \leq 1$, preferably $0.2 \leq x/y \leq 0.5$, more preferably, $0.20 \leq x/y \leq 0.37$, and most preferably, $x/y=0.33$. This is because theoretically, when $z/y=3$, $x/y=0.33$, it is considered that the added M element is arranged in all the hexagonal voids. Typical examples include $Cs_{0.33}WO_3$, $Cs_{0.03}Rb_{0.30}WO_3$, $Rb_{0.33}WO_3$, $K_{0.33}W_3$, $Ba_{0.33}WO_3$ and the like.

Here, the present inventors have repeated study on measures to further improve a near-infrared absorption function of the composite tungsten oxide fine particles, and found a configuration for further increasing an amount of free electrons contained.

Namely, as a measure to increase the amount of free electrons, the present inventors found that mechanical treatment is applied to the composite tungsten oxide fine particles to impart appropriate strain or deformation to the contained hexagonal crystal. In the hexagonal crystal imparted the appropriate strain or deformation, it is considered that an overlapping state of electron orbits in the atoms composing the crystallite structure changes, and the amount of free electrons increases.

Based on the above finding, the present inventors study on a further improvement of the near-infrared absorption function of the composite tungsten oxide fine particles by pulverizing the particles of the composite tungsten oxide under predetermined conditions, thereby imparting strain or deformation to the crystal structure to increase free electrons, in a dispersion step when producing the composite tungsten oxide fine particle dispersion liquid from the particles of the composite tungsten oxide generated in the firing step of "[b] Method for synthesizing composite tungsten oxide fine particles" described later.

Then, from this study, the particles of the composite tungsten oxide generated through the firing step were examined by focusing on each particle. Then, it is found that there is a variation of the lattice constants and the composition of the constituent elements among the particles.

As a result of further study, it is found that desired optical properties are exhibited in the finally obtained composite tungsten oxide fine particles if the lattice constant is within a predetermined range, regardless of the variation in the lattice constants and the composition of constituent elements among the particles.

The present inventors having obtained the above-described finding, further study on the optical properties exhibited by the fine particles while grasping the degree of strain or deformation of the crystal structure of the fine particles by measuring a-axis and c-axis which are lattice constants in the crystal structure of the composite tungsten oxide fine particles.

Then, as a result of the study, it is found that when the hexagonal composite tungsten oxide fine particles have the lattice constant of 7.3850 Å or more and 7.4186 Å or less on the a-axis, and 7.5600 Å or more and 7.6240 Å or less on the c-axis, the fine particles show a light transmittance having a local maximum value in a wavelength range from 350 nm to 600 nm and a local a minimum value in a wavelength range from 800 nm to 2100 nm, and the fine particles are near-infrared absorbing material particles exhibiting excellent near-infrared absorption effect.

Further, it is also found that when the value of x/y indicating the added amount of the M element is within a range of $0.20 \leq x/y \leq 0.37$ in the hexagonal composite tungsten oxide fine particles having the lattice constants on the a-axis and c-axis of the composite tungsten oxide fine particles according to the present invention, such as 7.3850 Å or more and 7.4186 Å or less on the a-axis, and 7.5600 Å or more and 7.6240 Å or less on the c-axis, the composite tungsten oxide fine particles exhibit particularly excellent near-infrared absorption effect.

Further, it is also found that in the composite tungsten oxide fine particles having a near-infrared absorbing ability, it is preferable that the composite tungsten oxide fine particles are single crystals having an amorphous phase volume ratio of 50% or less.

When the composite tungsten oxide fine particles are single crystals having the amorphous phase volume ratio of 50% or less, it is considered that the crystallite size can be set to 10 nm or more and 100 nm or less while maintaining the lattice constant within the above-described predetermined range, and the composite tungsten oxide fine particles can exhibit excellent optical properties.

Note that the fact that the composite tungsten oxide fine particles are single crystals can be confirmed, because only uniform lattice fringes are observed and no grain boundaries are observed in an electron microscope image by a transmission electron microscope etc. Also, the fact that the amorphous phase volume ratio in the composite tungsten oxide fine particles is 50% or less can be confirmed because uniform lattice fringes are observed throughout the fine particles, and almost no places where the lattice fringes are indistinct are observed.

Further, the amorphous phase often exists around an outer periphery of each fine particle, and therefore by paying attention to the outer periphery of each fine particle, the amorphous phase volume ratio can be calculated in many cases. For example, when the fine particles are truly spherical composite tungsten oxide fine particles and an amorphous phase with unclear lattice fringes exists in a layer form on the outer periphery of the fine particles, and when the thickness is 10% or less of the average particle size, the amorphous phase volume ratio in the composite tungsten oxide fine particles is 50% or less.

On the other hand, when the composite tungsten oxide fine particles are dispersed in a matrix of a solid medium such as a resin composing the composite tungsten oxide fine particle dispersion body, it can be said that the composite tungsten oxide fine particles are single crystals having the amorphous phase volume ratio of 50% or less, if the value obtained by subtracting the crystallite size from the average particle size of the dispersed composite tungsten oxide fine particles is 20% or less of the average particle size.

As described above, it is preferable to appropriately adjust a synthesis step, a pulverization step, and a dispersion step of the composite tungsten oxide fine particles according to a production facility, so that the value obtained by subtracting the crystallite size from the average particle size of the composite tungsten oxide fine particles dispersed in the composite tungsten oxide fine particle dispersion body is 20% or less of the average particle size.

Note that as a measurement of the crystal structure and the lattice constant of the composite tungsten oxide fine particles, a-axis length and c-axis length can be calculated as lattice constants by specifying the crystal structure included in the fine particles by X-ray diffraction, and by using the Rietveld method, for the composite tungsten oxide fine particles obtained by removing the solvent of the composite tungsten oxide fine particle dispersion liquid.

(2) Particle Size and Crystallite Size

The composite tungsten oxide fine particles according to the present invention have an average particle size of 100 nm or less. Then, the average particle size is preferably from 10 nm to 100 nm, more preferably from 10 nm to 80 nm, and still more preferably from 10 nm to 60 nm, from a viewpoint of exhibiting better near-infrared absorption properties. When the average particle size is in a range of 10 nm or more and 60 nm or less, most excellent infrared absorption properties are exhibited.

Here, the average particle size is a value of a diameter of each composite tungsten oxide fine particle that is not aggregated, and is the average particle size of the composite tungsten oxide fine particles contained in the composite tungsten oxide fine particle dispersion body described below.

On the other hand, the average particle size does not include a diameter of an aggregate of the composite tungsten oxide fine particles, and is different from the dispersed particle size.

Note that the average particle size is calculated from an electron microscope image of the composite tungsten oxide fine particles.

The average particle size of the composite tungsten oxide fine particles contained in the composite tungsten oxide fine particle dispersion body can be obtained by measuring the particle size of 100 composite tungsten oxide fine particles using an image processing device, and calculating the average value of them, from a transmission electron microscopy image of a thinned sample of the composite tungsten oxide fine particle dispersion body taken out by cross-section processing. A microtome, a cross section polisher, a focused ion beam (FIB) device, etc., can be used for the cross-section processing to remove the thinned sample. Note that the average particle size of the composite tungsten oxide fine particles contained in the composite tungsten oxide fine particle dispersion body, is the average value of the particle sizes of the composite tungsten oxide fine particles dispersed in the solid medium serving as a matrix.

Further, the crystallite size of the composite tungsten oxide fine particles is preferably from 10 nm to 100 nm, more preferably from 10 nm to 80 nm, and still more preferably from 10 nm to 60 nm, from a viewpoint of exhibiting excellent infrared absorption properties. This is because when the crystallite size is in a range of 10 nm or more and 60 nm or less, most excellent infrared absorption properties are exhibited.

Note that the lattice constant and the crystallite size of the composite tungsten oxide fine particles contained in the composite tungsten oxide fine particle dispersion liquid obtained after crushing, pulverizing or dispersing treatment as described below, are maintained even in the composite tungsten oxide fine particles obtained by removing a volatile component from the composite tungsten oxide fine particle dispersion liquid, and the composite tungsten oxide fine particles contained in the composite tungsten oxide fine particle dispersion body obtained from the composite tungsten oxide fine particle dispersion liquid.

As a result, the effect of the present invention is exhibited, even in the composite tungsten oxide fine particle dispersion liquid, and composite tungsten oxide fine particle dispersion body containing the composite tungsten oxide fine particles according to the present invention.

(3) Composition of Composite Tungsten Oxide Fine Particles

The composite tungsten oxide fine particles according to the present invention are preferably composite tungsten oxide fine particles represented by a general formula $M_xW_yO_z$ (wherein M is at least one element selected from H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb, W is tungsten, O is oxygen, satisfying $0.001 \leq x/y \leq 1$, $2.0 < z/y \leq 3.0$).

The composite tungsten oxide fine particles represented by the general formula $M_xW_yO_z$ will be described.

M element, x, y, and z, and a crystal structure thereof in the general formula $M_xW_yO_z$ are closely related to a free electron density of the composite tungsten oxide fine particles, and has a great influence on the infrared absorption properties.

Generally, there are no effective free electrons in tungsten trioxide ($WO_3$), and therefore the near-infrared absorption properties are low.

Here, the present inventors found that by adding M element (wherein the M element is at least one element selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb) to the tungsten oxide, to obtain the composite tungsten oxide, and thereby free electrons are generated in the composite tungsten oxide, and absorption properties derived from the free electrons are expressed in a near-infrared region, and therefore, the composite tungsten oxide is effective as a near-infrared absorbing material for absorbing near-infrared light with around 1000 nm wavelength, and the composite tungsten oxide also maintains a chemically stable state and is effective as an infrared absorbing material having excellent chemical resistance. It is also found that Cs, Rb, K, Tl, Ba, Cu, Al, Mn, and In are preferable as the M element, and among them, when the M element is Cs or Rb, the composite tungsten oxide easily has a hexagonal structure. As a result, the composite tungsten oxide transmits visible light, absorbs near-infrared light and converts it to heat, and therefore Cs and Rb as the M element is particularly preferable for the reason described below.

Here, the finding of the present inventors regarding the value of x indicating an added amount of the M element will be described.

When the value of x/y is 0.001 or more, a sufficient amount of free electrons is generated and a desired near-infrared absorption property can be obtained. Then, as the added amount of the M element is increased, a feed amount of the free electrons is increased and the near-infrared absorption property is also increased, but when the value of x/y is about 1, the effect is saturated. Further, when the value of x/y is 1 or less, generation of an impurity phase in the composite tungsten fine particles can be avoided, which is preferable.

Next, the finding of the present inventors regarding the value of z indicating a control of an oxygen amount will be described.

In the composite tungsten oxide fine particles represented by the general formula $M_xW_yO_z$, the value of z/y is preferably $2.0 < z/y \leq 3.0$, more preferably, $2.2 \leq z/y \leq 3.0$, further preferably, $2.6 \leq z/y \leq 3.0$, and most preferably, $2.7 \leq z/y \leq 3.0$. This is because when the value of z/y is 2.0 or more, it is possible to avoid an appearance of a crystal phase of $WO_2$, which is a compound other than a target compound, in the composite tungsten oxide, and possible to obtain a chemical stability as a material, and possible to apply as an effective infrared absorbing material. On the other hand, when the value of z/y is 3.0 or less, a required amount of the free electrons is generated in the tungsten oxide, and the composite tungsten oxide becomes an efficient infrared absorbing material.

(4) Surface Coating Layer of Composite Tungsten Oxide Fine Particle

In order to improve the weather resistance of the composite tungsten oxide fine particles, at least a part of the surface of the composite tungsten oxide fine particles is preferably coated with a surface coating layer containing at least one element selected from silicon, zirconium, titanium and aluminum. These surface coating layers are basically transparent, and do not reduce a visible light transmittance when added. A coating method is not particularly limited, but the surface of the composite tungsten oxide fine particles can be coated by adding an alkoxide of a metal containing the above element to a solution in which the composite tungsten oxide fine particles are dispersed. In this case, it is more preferable that the surface coating layer be composed of an oxide although the surface coating layer contains oxygen atoms.

(5) Summary

As described above in detail, the lattice constant, the average particle size, and the crystallite size of the composite tungsten oxide fine particles can be controlled by predetermined production conditions, and specifically can be controlled by appropriate setting of synthesis conditions such as a temperature at which the fine particles are generated (firing temperature), generation time (firing time), production atmosphere (firing atmosphere), precursor raw material form, annealing after generation, and doping of impurity elements, in the a thermal plasma method and a solid-phase reaction method described below.

[b] A Method for Synthesizing Composite Tungsten Oxide Fine Particles

A method for synthesizing composite tungsten oxide fine particles according to the present invention will be described.

The method for synthesizing composite tungsten oxide fine particles according to the present invention includes: a thermal plasma method of charging a starting material of a tungsten compound into a thermal plasma; and a solid-phase reaction method of heat-treating the tungsten compound starting material in reducing gas atmosphere. The composite tungsten oxide fine particles synthesized by the thermal plasma method or the solid-phase reaction method are subjected to a dispersion treatment or a pulverization/dispersion treatment.

Hereinafter. (1) the thermal plasma method. (2) the solid-phase reaction method, and (3) the synthesized composite tungsten oxide fine particles, will be described in this order.

(1) The Thermal Plasma Method

The thermal plasma method will be described in an order of (i) a raw material used for the thermal plasma method, and (ii) the thermal plasma method and its conditions.

(i) A Raw Material Used for the Thermal Plasma Method

When synthesizing the composite tungsten oxide fine particles according to the present invention by a thermal plasma method, a mixed powder of a tungsten compound and an M element compound can be used as a raw material.

The tungsten compound is preferably one or more selected from tungstic acid ($H_2WO_4$), ammonium tungstate, tungsten hexachloride, tungsten hydrate which is obtained by adding water to tungsten hexachloride dissolved in alcohol to be hydrolyzed and thereafter evaporating a solvent.

Further, as the M element compound, it is preferable to use one or more selected from oxides, hydroxides, nitrates, sulfates, chlorides, and carbonates of the M element.

The above-described tungsten compound and an aqueous solution containing the above-described M element compound are wet-mixed, so that the ratio of M element to W element is the ratio of M element to W element of $M_xW_yO_z$ (where M is the M element. W is tungsten, O is oxygen, satisfying $0.001 \leq x/y \leq 1.0$, $2.0 \leq z/y \leq 3.0$). Then, by drying the obtained mixture, mixed powder of a M element compound and a tungsten compound is obtained, and the mixed powder can be used as a raw material for the thermal plasma method.

Further, the composite tungsten oxide obtained by firing the mixed powder in a first stage under an inert gas alone or a mixed gas atmosphere of the inert gas and a reducing gas, can also be used as a raw material for the thermal plasma method. Besides, the composite tungsten oxide obtained by two stage firing such as first firing of the mixed powder in the mixed gas atmosphere of the inert gas and the reducing gas, and a second firing of the first fired material in the inert gas atmosphere, can also be used as the raw material for the thermal plasma method.

(ii) The Thermal Plasma Method and its Conditions

As the thermal plasma used in the present invention, for example, any one of DC arc plasma, high-frequency plasma, microwave plasma, low frequency alternating current plasma, or superimposed plasma of them, or plasma generated by an electric method of applying a magnetic field to direct current plasma, plasma generated by irradiation of a large output laser, and plasma generated by high power electron beam or ion beam, can be used. However, regardless of which thermal plasma is used, it is preferable to use thermal plasma having a high temperature part of 10000 to 15000 K, and particularly to use plasma capable of controlling the time for generating the fine particles.

The raw material fed into the thermal plasma having the high temperature part is evaporated instantaneously in the high temperature part. Then, the evaporated raw material is condensed in the course of reaching a plasma tail flame part, and is rapidly solidified outside of the plasma flame, thereby producing the composite tungsten oxide ultrafine particles.

A synthesis method will be described with reference to FIG. 1 taking as an example a case of using a high-frequency plasma reaction device.

First, an inside of a reaction system constituted by an inside of a water-cooled quartz double tube and an inside of a reaction vessel 6 is evacuated to about 0.1 Pa (about 0.001 Torr) by a vacuum exhaust device. After evacuating the inside of the reaction system, this time the inside of the reaction system is filled with argon gas to make an argon gas flow system of 1 atm.

Thereafter, any gas selected from argon gas, mixed gas of argon and helium (Ar—He mixed gas), mixed gas of argon and nitrogen (Ar—$N_2$ mixed gas) is introduced into the reaction vessel as a plasma gas at a flow rate of 30 to 45 L/min. On the other hand, Ar—He mixed gas is introduced at a flow rate of 60 to 70 L/min, as the sheath gas to be flowed to immediately outside of the plasma region.

Then, an alternating current is applied to the high-frequency coil 2 to generate thermal plasma by a high-frequency electromagnetic field (frequency 4 MHz). At this time, high-frequency power is set to 30 to 40 kW.

Further, reaction is carried out for a predetermined time by introducing mixed powder of M element compound and tungsten compound obtained by the above synthesis method, or a raw material of the composite tungsten oxide, from a raw material powder feed nozzle 5 into thermal plasma, for example, at a feed rate of 25 to 50 g/min, using 6-98 L/min argon gas supplied from gas a gas supply device as carrier gas. After the reaction, the generated composite tungsten oxide fine particles are deposited on a filter 8 through an absorption tube 7, which are then collected.

The carrier gas flow rate and the raw material feed rate have a great influence on the particle generation time. Therefore, it is preferable that the carrier gas flow rate is 6 L/min or more and 9 L/min or less and the raw material feed rate is 25 to 50 g/min.

Further, it is preferable that a plasma gas flow rate is 30 L/min or more and 45 L/min or less, and a sheath gas flow rate is 60 L/min or more and 70 L/min or less. Plasma gas has a function of maintaining a thermal plasma region having a high temperature region of 10.000 to 15000K, and sheath gas has a function of cooling an inner wall surface of a quartz torch in a reaction vessel and preventing the quartz torch from melting. At the same time, the plasma gas and the sheath gas affect a shape of a plasma region, and therefore the flow rates of these gases are important parameters for controlling the shape of the plasma region. As the plasma gas and sheath gas flow rates are increased, the shape of the plasma region extends in a gas flow direction, and a temperature gradient of a plasma tail flame becomes gentle, and therefore the generation time (firing time) of the generated fine particles is lengthened, and fine particles having good crystallinity can be generated.

When the composite tungsten oxide synthesized by the thermal plasma method has a crystallite size exceeding 200 nm, and when the composite tungsten oxide in the composite tungsten oxide fine particle dispersion liquid obtained from the composite tungsten oxide synthesized by the thermal plasma method has a dispersed particle size exceeding 200 nm, a pulverization/dispersion treatment, which will be described below, can be performed. When synthesizing the composite tungsten oxide by the thermal plasma method, the plasma conditions and the subsequent pulverization/dispersion treatment conditions are appropriately selected, and the pulverization conditions (finely pulverizing conditions) are defined to determine the average particle size, the crystallite size of the composite tungsten oxide fine particles of the present invention and the a-axis length and c-axis length as the lattice constants. Thus, the effect of the present invention is exhibited.

(2) The Solid-Phase Reaction Method

The solid-state reaction method will be described in an order of (i) raw materials used in the solid-state reaction method, and (ii) firing and its conditions in the solid-phase reaction method.

(i) Raw Materials Used in the Solid-State Reaction Method

When synthesizing the composite tungsten oxide fine particles according to the present invention by the solid-phase reaction method, a tungsten compound and an M element compound are used as raw materials.

The tungsten compound is preferably one or more selected from tungstic acid ($H_2WO_4$), ammonium tungstate, tungsten hexachloride, tungsten hydrate which is obtained by adding water to tungsten hexachloride dissolved in alcohol to be hydrolyzed and thereafter evaporating a solvent.

Further, as a M element compound used for production of a raw material for the composite tungsten oxide fine particles represented by a general formula $M_xW_yO_z$ which is a more preferable embodiment (where, M is one or more elements selected from Cs, Rb, K, Tl, Ba, and In, and satisfying $0.001 \leq x/y \leq 1$, $2.0 \leq z/y \leq 3.0$), it is preferable to use one or more selected from oxides, hydroxides, nitrates, sulfates, chlorides, and carbonates of the M element.

Further, a compound containing at least one impurity element selected from Si, Al, and Zr (it may be described as "an impurity element compound" in the present invention) may be contained as a raw material. The impurity element compound does not react with the composite tungsten compound in the subsequent firing step, and suppresses crystal growth of the composite tungsten oxide and prevents crystal coarsening. The compound containing an impurity element is preferably one or more selected from oxides, hydroxides, nitrates, sulfates, chlorides, and carbonates, and colloidal silica or colloidal alumina having a particle size of 500 nm or less is particularly preferable.

The above-described tungsten compound and an aqueous solution containing the above-described M element compound are wet-mixed, so that the ratio of M element to W element is the ratio of M element to W element $M_xW_yO_z$ (where M is the M element, W is tungsten, O is oxygen, satisfying $0.001 \leq x/y \leq 1.0$, $2.0 \leq z/y \leq 3.0$). When containing the impurity element compound as a raw material, wet mixing is performed so that the impurity element compound is 0.5% by mass or less. Then, by drying the obtained mixture, mixed powder of the M element compound and the tungsten compound, or mixed powder of the tungsten compound and the M element compound containing the impurity element compound can be obtained.

(ii) Firing and its Conditions in the Solid-Phase Reaction Method

Mixed powder of the M element compound and the tungsten compound produced by the wet-mixing, or mixed powder of the tungsten compound and the M element compound containing an impurity element compound is fired in a first stage under an atmosphere of an inert gas alone or a mixed gas of the inert gas and a reducing gas. A firing temperature is preferably close to a temperature at which the composite tungsten oxide fine particles begin to crystallize, and specifically the firing temperature is preferably 1000° C. or lower, more preferably 800° C. or lower, and even more preferably 800° C. or lower and 500° C. or higher.

Although the reducing gas is not particularly limited, $H_2$ is preferable. Further, when $H_2$ is used as the reducing gas, the concentration may be appropriately selected according to the firing temperature and an amount of a starting material, and is not particularly limited, and for example, it is 20% by volume or less, preferably 10% by volume or less, more preferably 7% by volume or less. This is because when the concentration of the reducing gas is 20% by volume or less, generation of $WO_2$ having no solar radiation absorbing function by rapid reduction can be avoided. At this time, by controlling the firing conditions, the average particle size, the crystallite size of the composite tungsten oxide fine particles of the present invention and the a-axis length and c-axis length as the lattice constants, can be set to predetermined values.

However, in the synthesis of the composite tungsten oxide fine particles, tungsten trioxide may be used instead of the tungsten compound.

(3) The Synthesized Composite Tungsten Oxide Fine Particles

When a composite tungsten oxide fine particle dispersion liquid described below is prepared using the composite tungsten oxide fine particles obtained by the synthesis method using the thermal plasma method or the solid phase reaction method, and when the dispersed particle size of the fine particles contained in the dispersion liquid exceeds 200 nm, pulverization/dispersion treatment may be performed in the step of producing the composite tungsten oxide fine particle dispersion liquid described below. Then, when the average particle size, the crystallite size, the a-axis length and c-axis length as the lattice constants of the composite tungsten oxide fine particles obtained through the pulverization/dispersion treatment satisfy the range of the present invention, the composite tungsten oxide fine particles and the composite tungsten oxide fine particle dispersion body obtained from the dispersion liquid of the composite tungsten oxide fine particles according to the present invention, can realize excellent near-infrared absorption properties.

As described above, the composite tungsten oxide fine particles according to the present invention have an average particle size of 100 nm or less.

Here, when the average particle size of the composite tungsten oxide particles obtained by the method described in "[b] method for synthesizing composite tungsten oxide particles" exceeds 100 nm, the composite tungsten oxide fine particles according to the present invention can be produced through the step of producing the composite tungsten oxide fine particles dispersion liquid by subjecting the particles to pulverization/dispersion treatment (pulverization/dispersion treatment step), and by drying the produced composite tungsten oxide fine particle dispersion liquid and removing the volatile component (mostly solvent).

Hereinafter. (i) pulverization/dispersion treatment step and (ii) drying step will be described in this order.

(i) Pulverization/Dispersion Treatment Step

The step of pulverizing and dispersing the composite tungsten oxide particles is the step of finely pulverizing the composite tungsten oxide fine particles, and uniformly dispersing the same together with a dispersant without aggregating into an appropriate uncured thermosetting resin monomer or an appropriate solvent described below.

The pulverization/dispersion treatment step is the step of ensuring that the average particle size of the composite tungsten oxide fine particles can be 100 nm or less, preferably 10 nm or more and 100 nm or less, and the crystal lattice constants can be, preferably, 7.3850 Å or more and 7.4186 Å or less on the a-axis, and 7.5600 Å or more and 7.6240 Å or less on the c-axis, more preferably, the value of [c-axis lattice constant/a-axis lattice constant] is 1.0221 or more and 1.0289 or less.

Specific methods of the pulverization and dispersion treatment include for example: a pulverization/dispersion treatment method using devices such as bead mill, ball mill, sand mill, paint shaker, ultrasonic homogenizer. Among them, pulverizing and dispersing with a medium stirring mill such as a bead mill, a ball mill, a sand mill, and a paint shaker using medium media such as beads, balls and Ottawa sand, is preferable because the time to reach a desired dispersed particle size is short.

By pulverization/dispersion treatment using the medium stirring mill, the formation of fine particles progresses due to the collision of the composite tungsten oxide particles with each other or the collision of the medium media with the particles, etc., at the same time as the dispersion of the composite tungsten oxide particles in the dispersion liquid, and the composite tungsten oxide fine particles can be made finer and dispersed (that is, pulverized and dispersed).

By a mechanical dispersion treatment step using these equipment, the formation of fine particles progresses due to the collision between composite tungsten oxide particles, and at the same time, strain or deformation is imparted to the hexagonal crystal structure contained in the composite tungsten oxide particles, and an overlapping state of electron orbits in the atoms composing the crystallite structure changes, and the increase in the amount of free electrons progresses.

Note that the formation of the composite tungsten oxide particles into fine particles and a fluctuation of the a-axis length and the c-axis length, which are lattice constants in the hexagonal crystal structure, depends on device constants of a pulverizing device. Accordingly, it is important to, in advance, obtain a pulverizing device and pulverization conditions capable of imparting to the composite tungsten oxide fine particles the above-described predetermined average particle size, crystallite size, and a-axis length or c-axis length as lattice constants, by performing a trial pulverization.

The state of the composite tungsten oxide fine particle dispersion liquid can be confirmed by measuring a dispersion state of the composite tungsten oxide particles when the tungsten oxide particles are dispersed in the solvent, and for example, can be confirmed by sampling from a liquid in which the composite tungsten oxide fine particles according to the present invention are present in the solvent as a state of fine particles or as an aggregated state of the fine particles, and measuring the dispersion state with various commercially available particle size distribution meters. As the particle size distribution meter, for example, a known measuring device such as ELS-8000 manufactured by Otsuka Electronics Co., Ltd. based on the principle of the dynamic light scattering method can be used.

The dispersed particle size of the composite tungsten oxide fine particles according to the present invention is preferably 200 nm or less, and more preferably the dispersed particle size is 10 nm or more and 200 nm or less.

A near-infrared absorbing component containing the composite tungsten oxide fine particles according to the present invention largely absorbs light in the near-infrared region, particularly in a wavelength range from 900 to 2200 nm, and therefore a transmission color tone of the visible light may change from blue to green. On the other hand the reason is as follows: when the dispersed particle size of the composite tungsten oxide fine particles contained in an infrared ray absorbing layer is 1 to 200 nm, the light in the visible light region of 380 nm to 780 nm wavelength is not scattered due to geometrical scattering or Mie scattering, and therefore coloring due to light scattering is reduced, and the visible light transmittance through the infrared absorption layer can be increased. Further, in a Rayleigh scattering region, the scattered light decreases in proportion to the sixth power of the particle size, and therefore as the dispersed particle size decreases, scattering decreases and transparency improves. Therefore, when the dispersed particle size is 200 nm or less, scattered light is extremely reduced, and transparency is further increased, which is preferable.

As described above, when the dispersed particle size of the fine particles is smaller than 200 nm, transparency can be secured, and therefore it becomes easy to color an infrared curable ink composition. When importance is placed to the transparency, the dispersed particle size is preferably 100 nm or less, more preferably 80 nm or less. On the other hand, when the dispersed particle size is 10 nm or more, industrial production is easy.

Here, the dispersed particle size of the composite tungsten oxide fine particles in the composite tungsten oxide fine particle dispersion liquid will be briefly described. The dispersed particle size of the composite tungsten oxide particles means single particles of the composite tungsten oxide fine particles dispersed in a solvent, or a particle size of the particles (aggregated particles) as an aggregate of the composite tungsten oxide fine particles, and can be measured by various commercially available particle size distribution meters. For example, a sample of the composite tungsten oxide fine particle dispersion liquid is collected, and the sample can be measured using ELS-8000 manufactured by Otsuka Electronics Co., Ltd. based on the principle of the dynamic light scattering method.

Further, the composite tungsten oxide fine particle dispersion liquid in which the content of the composite tungsten oxide fine particles obtained by the above synthesis method is 0.01 mass % or more and 80 mass % or less, is excellent in liquid stability. Gelation of the dispersion liquid or sedimentation of the particles did not occur for 6 months or more even when placed in a constant temperature bath at a temperature of 40° C., as long as an appropriate liquid medium, dispersant, coupling agent, or surfactant is selected, and the dispersed particle size can be maintained within a range of 10 to 200 nm.

Note that the dispersed particle size in the composite tungsten oxide fine particle dispersion liquid may differ from the average particle size of the composite tungsten oxide fine particles dispersed in the composite tungsten oxide fine particle dispersion body. This is because in the composite tungsten oxide fine particle dispersion liquid, aggregation of the composite tungsten oxide particles is released even if the composite tungsten oxide fine particles aggregate, when processing from the composite tungsten oxide fine particle dispersion liquid to the composite tungsten oxide fine particle dispersion body.

(ii) Drying Step

A drying step is a step of applying drying treatment to the composite tungsten oxide fine particle dispersion liquid obtained in the above-mentioned pulverization/dispersion step, and removing a volatile component in the dispersion liquid, to obtain the composite tungsten oxide fine particles according to the present invention.

As the equipment for drying treatment, air dryer, universal mixer, ribbon mixer, vacuum fluid dryer, vibration fluid dryer, freeze dryer, ribo cone, rotary kiln, spray dryer, palcon dryer, etc., are preferable, from a viewpoint that heating and/or depressurization is possible and mixing and recovery of the fine particles are easy, but the equipment is not limited thereto.

[c] A Metal Coupling Agent Having an Amino Group

As described above, the adhesive layer containing the composite tungsten oxide fine particles according to the conventional technique may have a high haze value, and it was sometimes difficult to apply it to a near-infrared absorbing film attached to existing windows. Further, the adhesive composition has low stability, and sometimes cloudiness or gelation occurs during storage, which causes a decrease in productivity. Under such a circumstance, the inventors of the present invention have studied on reducing the haze value in the adhesive layer and improving the stability of the adhesive composition. Then, as described above, it was found that by adding a metal coupling agent having an amino group to the adhesive layer or the adhesive composition, the haze value of the adhesive layer can be reduced and the stability of the adhesive composition can be improved.

On the other hand, the adhesive layer may cause a light-coloring phenomenon in which the transmittance decreases due to long-term exposure to strong ultraviolet rays, for example. However, according to the study by the present inventors, it is also found that the adhesive layer according to the present invention containing a metal coupling agent having an amino group can suppress the light-coloring phenomenon, and can improve a weather resistance of the composite tungsten oxide particles.

The metal coupling agent having an amino group according to the present invention will be described hereafter.

As the metal coupling agent having an amino group according to the present invention, it is not particularly limited as long as it has an amino group in its structure, and for example, a silane coupling agent a titanate coupling agent, an aluminate coupling agent, etc., can be used. Among them, the silane coupling agent having an amino group and the titanate coupling agent having an amino group can be preferably used.

Further, depending on the type of functional group of the metal coupling agent having an amino group, dispersibility of the composite tungsten oxide fine particles in the adhesive layer can be improved, and the transparency of the adhesive layer can also be improved.

This is because the functional group contained in the metal coupling agent having an amino group is adsorbed on the composite tungsten oxide fine particles, which may prevent aggregation with other composite tungsten oxide particles due to steric hindrance. In this case, by adding the metal coupling agent having an amino group, it is possible to have both the effect of adding the metal coupling agent having an amino group described above and the effect of adding the dispersant.

As the metal coupling agent having an amino group that exerts such an effect, for example, 3-aminopropyltrimethoxysilane, 3-aminopropyltriethoxysilane, 3-(2-aminoethylamino) propyltrimethoxysilane, 3-(2-aminoethylamino) propyldimethoxymethylsilane, Trimethoxy [3-(phenylamino) propyl]silane, 3-(2-aminoethylamino) propyltrimethoxysilane, isopropyl tri (N-aminoethyl/aminoethyl) titanate, etc. can be suitably used.

Further, for example, when the silane coupling agent having an amino group is used as the metal coupling agent having an amino group, the use in the adhesive layer is not limited to the silane coupling agent having one type of amino group. For example, a silane coupling agent having one type or two or more types of amino groups can be added at the same time.

Here, the content of the metal coupling agent having an amino group in the adhesive layer is not particularly limited, and can be optionally selected depending on a near-infrared absorption performance and a visible light transmittance required for the adhesive layer, a haze value, weather resistance of the composite tungsten oxide fine particles, and the degree of dispersibility of the fine particles described above, etc.

However, the content (content rate) of the metal coupling agent having an amino group in the adhesive layer is preferably 0.01 mass % or more and 0.60 mass % or less, more preferably 0.01 mass % or more and 0.50 mass % or less. This is because when the content of the metal coupling agent having an amino group is 0.01 mass % or more, the effect of adding the metal coupling agent having an amino group as described above can be sufficiently exhibited. Also, this is because when the content is 0.60 mass % or less, the precipitation of the metal coupling agent having an amino group is reliably suppressed in the adhesive layer, and the transparency and design of the adhesive layer is not significantly affected.

The content ratio of the metal coupling agent having an amino group with respect to the composite tungsten oxide fine particles is not particularly limited, and can be optionally selected depending on a near-infrared absorption performance and a visible light transmittance required for the adhesive layer, a haze value, weather resistance of the composite tungsten oxide fine particles, and the degree of dispersibility of the fine particles described above, etc.

However, it is preferable to contain the metal coupling agent having an amino group in a proportion of 1 part by mass or more and 100 parts by mass or less based on 100 parts by mass of the composite tungsten oxide fine particles.

This is because when the adhesive layer contains the metal coupling agent having an amino group in the proportion of 1 part by mass or more based on 100 parts by mass of the composite tungsten oxide fine particles, the stability of the adhesive composition can be sufficiently maintained, and the occurrence of cloudiness and gelation can be suppressed more reliably, and therefore, it is possible to suppress the haze value of the adhesive layer and form the adhesive layer with good productivity. Also, this is because the weather resistance of composite tungsten oxide particles can be improved.

On the other hand, when the adhesive layer contains 100 parts by mass or less of the metal coupling agent having an amino group based on 100 parts by mass of the composite tungsten oxide fine particles, it is possible to reliably suppress the precipitation of the metal coupling agent having an amino group, and therefore the transparency or design of the adhesive layer is not significantly affected.

Note that when the adhesive layer contains the composite tungsten oxide fine particles, the content of the metal coupling agent having an amino group preferably satisfies the above range, based on 100 parts by mass of the total content of both fine particles of the composite tungsten oxide fine particles contained in the adhesive layer and the metal coupling agent having an amino group.

Further, in the adhesive composition as well, when the adhesive composition contains the composite tungsten oxide fine particles, the content of the metal coupling agent having an amino group preferably satisfies the above range, based on 100 parts by mass of the total content of both fine particles of the composite tungsten oxide fine particles contained in the adhesive layer and the metal coupling agent having an amino group.

[d] An Adhesive

The adhesive contained in the adhesive layer according to the invention is not particularly limited. However, the adhesive preferably includes one or more polymer selected from acrylic polymer, epoxy polymer, urethane polymer, styrene acrylic polymer, polyester polymer, silicone polymer, etc. Among them, it is more preferable to include acrylic polymer.

Note that the adhesive contained in the adhesive layer according to the present invention is derived from the adhesive added to the adhesive composition.

The content of the adhesive added to the adhesive composition described above is not particularly limited. However, the content of the adhesive is preferably 50 mass % or more, more preferably 60 mass % or more, based on 100 mass % of a solid content including the adhesive in the adhesive composition. On the other hand, an upper limit of the content of the adhesive in the adhesive composition is not particularly limited, but is preferably 99.999 mass % or less, for example.

Hereinafter, with an acrylic polymer as an example of the adhesive contained in the adhesive layer according to the present invention, (I) Structure of acrylic polymer. (2) Method for preparing acrylic polymer, (3) Molecular weight of the acrylic polymer, will be described in this order.

(1) Structure of Acrylic Polymer

As described above, the adhesive preferably contains acrylic polymer. The acrylic polymer is preferably (Meth) acrylic acid alkyl ester whose alkyl group has 1 to 12 carbon atoms (in the present invention, it may be referred to as "(meth) acrylic acid C1-12 alkyl ester") and/or polymer composed of (meth) acrylic acid alkoxyalkyl ester as a monomer main component (monomer main component).

Note that as the monomer component composing the adhesive, in addition to the above-described monomer main component, other copolymerizable monomer component (copolymerizable monomer) may be contained.

Further, the expression "(meth) acrylic" means "acrylic" and/or "methacrylic" in the present invention.

The above-described (meth) acrylic acid C1-12 alkyl ester is (Meth) acrylic acid alkyl ester having a linear or branched alkyl group having 1 to 12 carbon atoms, For example, includes: methyl (meth) acrylate, ethyl (meth) acrylate, propyl (meth) acrylate, isopropyl (meth) acrylate, n-butyl (meth) acrylate, isobutyl (meth) acrylate, sec-butyl (meth) acrylate, t-butyl (meth) acrylate, pentyl (meth) acrylate, isopentyl (meth) acrylate, neopentyl (meth) acrylate, hexyl (meth) acrylate, heptyl (meth) acrylate, octyl (meth) acrylate, isooctyl (meth) acrylate, 2-ethylhexyl (meth) acrylate, nonyl (meth) acrylate, isononyl (meth) acrylate, decyl (meth) acrylate, isodecyl (meth) acrylate, undecyl (meth) acrylate, dodecyl (meth) acrylate, etc.

Among them, as (meth) acrylic acid C1-12 alkyl ester, one or more selected from ethyl acrylate, n-butyl acrylate, 2-ethylhexyl acrylate, and isononyl acrylate, can be preferably used. Particularly, one or more selected from 2-ethylhexyl acrylate (2EHA) and n-butyl acrylate (BA) can be more preferably used.

The (meth) acrylic acid C1-12 alkyl ester can be used alone or in combination of two or more kinds.

The above-described (meth) acrylic acid alkoxyalkyl ester is not particularly limited, and preferably includes for example: 2-methoxyethyl (meth) acrylate, 2-ethoxyethyl (meth) acrylate, methoxytriethylene glycol (meth) acrylate, 3-methoxypropyl (meth) acrylate, 3-Ethoxypropyl (meth) acrylate, 4-methoxybutyl (meth) acrylate, 4-ethoxybutyl (meth) acrylate, etc. Among them, acrylic acid alkoxyalkyl ester is preferable, and 2-methoxyethyl acrylate (2MEA) is more preferable.

Note that the (meth) acrylic acid alkoxyalkyl ester can be used individually or in combination of 2 or more types.

The content of (Meth) acrylic acid C1-12 alkyl ester and/or (meth) acrylic acid alkoxyalkyl ester, which are the above-described monomer main components is preferably 50% by mass or more, more preferably 80 mass % or more, and further preferably 90 mass % or more, based on 100 mass % of the total amount of monomer components (total amount of monomer components) composing the acrylic polymer. On the other hand, an upper limit of the content based on 100 mass % of the total monomer components composing the acrylic polymer is not particularly limited, but is preferably 99.5 mass % or less, and more preferably 99 mass % or less.

Note that when both (meth) acrylic acid C1-12 alkyl ester and (meth) acrylic acid alkoxyalkyl ester are used as the monomer component, it is preferable that the total amount (total content) of the content of (meth) acrylic acid C1-12 alkyl ester and the content of (meth) acrylic acid alkoxyalkyl ester, satisfies the above content range.

Further, polar group-containing monomer, polyfunctional monomer, and other copolymerizable monomer may be contained in the monomer component composing the above acrylic polymer, as copolymerizable monomer components.

The above polar group-containing monomer includes, for example: carboxyl group-containing monomer such as (meth) acrylic acid, itaconic acid, maleic acid, fumaric acid, crotonic acid, isocrotonic acid, or acid anhydride (maleic anhydride, etc.) thereof; hydroxyalkyl (meth) acrylate such as 2-hydroxyethyl (meth) acrylate, 3-hydroxypropyl (meth) acrylate, 4-hydroxybutyl (meth) acrylate, 6-hydroxyhexyl (meth) acrylate, hydroxyl group-containing monomer such as vinyl alcohol and allyl alcohol; amide group-containing monomer such as (meth) acrylamide, N, N-dimethyl (meth) acrylamide, N-methylol (meth) acrylamide, N-methoxymethyl (meth) acrylamide, N-butoxymethyl (meth) acrylamide. N-hydroxyethylacrylamide; amino group-containing monomer such as aminoethyl (meth) acrylate, dimethylaminoethyl (meth) acrylate, t-butylaminoethyl (meth) acrylate; glycidyl group-containing monomer such as glycidyl (meth) acrylate, methylglycidyl (meth) acrylate; cyano group-containing monomers such as acrylonitrile and methacrylonitrile; heterocycle-containing vinyl monomer such as N-vinyl pyridine, N-vinyl piperidone, N-vinyl pyrimidine, N-vinyl piperazine. N-vinyl pyrrole, N-vinyl imidazole, N-vinyl oxazole, other than N-vinyl-2-pyrrolidone, (meth) acryloylmorpholine; sulfonic acid group-containing monomer such as sodium vinyl sulfonate; phosphoric acid group-containing monomer such as 2-hydroxyethyl acryloyl phosphate; imide group-containing monomers such as cyclohexylmaleimide and isopropylmaleimide; isocyanate group-containing monomers such as 2-methacryloyloxyethyl isocyanate, etc.

Note that the above polar group-containing monomers can be used alone or in combination of two or more. As the polar group-containing monomer, it is preferable to contain one or more selected from carboxyl group-containing monomer or acid anhydrides and hydroxyl group-containing monomer, and particularly preferable to contain one or more selected from acrylic acid (AA), 4-hydroxybutyl acrylate (4HBA), 2-hydroxyethyl acrylate (HEA).

The content of the above polar group-containing monomer is preferably 15 mass % or less, more preferably 10 mass % or less, based on 100% of the total amount of monomer components (total amount of monomer components) composing the acrylic polymer. This is because when the content of the polar group-containing monomer is 15 mass % or less, the cohesive force of the adhesive layer does not become excessive and the adhesiveness is secured. Also, this is because excessive polar groups can become crosslinking points, which can avoid overcrowding of crosslinking (excess crosslinking).

On the other hand, a lower limit value of the content of the polar group-containing monomer described above is not particularly limited, based on 100 mass % of the total amount of monomer components (total amount of monomer components) composing the acrylic polymer, but for example, it is preferably 0.01 mass % or more, and more preferably 0.5 mass % or more. This is because by setting the content of the polar group-containing monomer to 0.01 mass % or more, the adhesiveness of the adhesive layer can be increased, and a crosslinking reaction can be performed at an appropriate rate.

The above-described polyfunctional monomer, for example, includes: hexanediol di (meth) acrylate, butanediol di (meth) acrylate, (poly) ethylene glycol di (meth) acrylate. (poly) propylene glycol di (meth) acrylate, neopentyl glycol di (meth) acrylate, pentaerythritol di (meth) acrylate, pentaerythritol tri (meth) acrylate, dipentaerythritol hexa (meth) acrylate, trimethylolpropane tri (meth) acrylate, tetramethylolmethane tri (meth) acrylate, allyl (meth) acrylate, vinyl (meth) acrylate, divinylbenzene, epoxy acrylate, polyester acrylate, urethane acrylate, etc.

The content of the above-described polyfunctional monomer is not particularly limited, based on 100 mass % of the total amount of monomer components (total amount of monomer components) composing the acrylic polymers, but is preferably 0.5 mass % or less, and more preferably 0.1 mass % or less.

This is because when the content of the polyfunctional monomer is 0.5 mass % or less, the adhesiveness of the adhesive layer is secured.

A lower limit value of the content of the above-described polyfunctional monomer is not particularly limited, based on 100 mass % of the total amount of monomer components (total amount of monomer components) composing the acrylic polymer, but for example, it can be 0 mass % or more.

Examples of copolymerizable monomers other than the above-described polar group-containing monomers and polyfunctional monomers (other copolymerizable monomers) include $C_{13}$ to $C_{20}$ alkyl esters of (meth)acrylic acid such as tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate, and eicosyl (meth)acrylate; (meth)acrylic acid esters other than the above-described (meth)acrylic acid alkyl esters, (meth)acrylic acid alkoxyalkyl esters, polar group-containing monomers, and polyfunctional monomers, for example, (meth)acrylate esters having alicyclic hydrocarbon group such as cyclopentyl (meth)acrylate, cyclohexyl (meth)acrylate, and isobornyl (meth)acrylate, and (meth)acrylate esters having aromatic hydrocarbon group such as phenyl (meth)acrylate; vinyl esters such as vinyl acetate, and vinyl propionate; aromatic vinyl compounds such as styrene, and vinyltoluene; olefins or dienes such as ethylene, butadiene, isoprene, and isobutylene; vinyl ethers such as vinyl alkyl ether; and vinyl chloride.

(2) Method for Preparing Acrylic Polymer

The above acrylic polymer can be prepared by various polymerization methods. A method for polymerizing acrylic polymer includes: for example, solution polymerization method, emulsion polymerization method, bulk polymerization method, polymerization method by ultraviolet irradiation, etc. Among them, the solution polymerization method is preferable in terms of transparency, water resistance, cost and the like.

The polymerization initiator used to polymerize the above-described acrylic polymer is not particularly limited, and can be optionally used, selected from various polymerization initiators. Specific examples preferably include oil-soluble polymerization initiators such as azo-based polymerization initiators such as azo-based polymerization initiators including 2,2'-azobisisobutyronitrile, 2,2'-azobis (4-methoxy-2,4-dimethylvaleronitrile), 2,2'-azobis(2,4-dimethylvaleronitrile), 2,2'-azobis(2-methylbutyronitrile), 1,1'-azobis(cyclohexane-1-carbonitrile), 2,2'-azobis(2,4,4-trimethylpentane), dimethyl-2,2'-azobis(2-methylpropionate); and peroxide-based polymerization initiators including benzoyl peroxide, t-butyl hydroperoxide, di-t-butylperoxide, t-butyl peroxybenzoate, dicumyl peroxide, 1,1-bis(t-butylperoxy)-3,3,5-trimethylcyclohexane, 1,1-bis(t-butylperoxy)cyclododecane.

The polymerization initiator can be used individually or in combination of 2 or more kinds. An amount of the used polymerization initiator may be a usual amount, and for example, the polymerization initiator can be selected from a range of 0.01 part by mass or more and 1 part by mass or less, based on 100 parts by mass of all monomer components composing acrylic polymer.

Note that various common solvents can be used for a solution polymerization. Such a solvent includes organic solvents like: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methyl ethyl ketone and methyl isobutyl ketone.

Note that the solvent can be used alone or in combination of two or more kinds.

(3) Molecular Weight of the Acrylic Polymer

A weight-average molecular weight of the above-described acrylic polymer is preferably 500,000 or more and 1,200,000 or less, more preferably 600,000 or more and 1,000,000 or less, and further preferably 600,000 or more and 900,000 or less.

In the adhesive layer of the present embodiment, it is preferable to increase the solid content concentration of the adhesive composition (solution) used when forming the adhesive layer and reduce a layer thickness of the coating layer (layer containing solvent) of the adhesive composition when dried. This is because it becomes easy to reduce an uneven thickness of an entire adhesive layer by suppressing a convection in the coating layer during drying.

Here, when the weight-average molecular weight of the acrylic polymer increases, viscosity of the adhesive composition becomes high at the same solid content concentration, compared with a case of a low weight-average molecular weight. Therefore, when the weight-average molecular weight of the acrylic polymer is 1.2 million or less, the solid content concentration of the adhesive composition can be increased, and unevenness in the entire thickness can be avoided from a viewpoint of coatability. From this viewpoint, the weight-average molecular weight of the acrylic polymer is preferably 1.2 million or less.

On the other hand, when the weight-average molecular weight of the acrylic polymer is 500.000 or more, the weight-average molecular weight of the sol is secured, and durability of the adhesive layer is secured. From this viewpoint, the weight-average molecular weight of the acrylic polymer is preferably 500,000 or more.

Note that the weight-average molecular weight of the acrylic polymer can be controlled depending on the kind and the use amount of polymerization initiator, temperature and time during polymerization, monomer concentration, monomer dropping rate, etc.

[e] A Dispersant, a Crosslinking Agent, Other Additional Component

The adhesive layer according to the present invention can contain an additive such as a dispersant, a crosslinking agent, and further, if necessary, an ultraviolet absorber, a light stabilizer, an antioxidant, a tackifier, a plasticizer, a softener, a filler, a colorant (such as pigments and dyes), a surfactant, an antistatic agents, in addition to the composite tungsten oxide fine particles, the metal coupling agent having an amino group, and the adhesive described above.

Hereinafter. (1) dispersant. (2) crosslinking agent. (3) ultraviolet absorber, (4) light stabilizer, (5) antioxidant, and (6) other additives will be described in this order.

(1) Dispersant

The adhesive layer according to the present invention may contain a dispersant in order to uniformly disperse the above-described composite tungsten oxide fine particles in the adhesive.

The dispersant is not particularly limited and can be optionally selected according to production conditions of the adhesive layer and the like. The dispersant is preferably a polymer dispersant, for example, and is preferably a dispersant having a main chain selected from any one of polyester, polyether, polyacrylic, polyurethane, polyamine, polystyrene, aliphatic, or a dispersant having a main chain in which two or more kinds of unit structures selected from polyester, polyether, polyacrylic, polyurethane, polyamine, polystyrene, aliphatic are copolymerized.

Further, the dispersant preferably has one or more selected from an amine-containing group, a hydroxyl group, a carboxyl group, a carboxyl-containing group, a sulfo group, a phosphoric acid group, or an epoxy group, as a functional group. The dispersant having any of the above functional groups is adsorbed on the surface of composite tungsten oxide particles, and aggregation of the composite tungsten oxide fine particles can be prevented more reliably. Therefore, the composite tungsten oxide fine particles can be dispersed more uniformly in the adhesive layer, and therefore can be preferably used.

Such dispersants includes: SOLSPERSE (registered trademark) (the same applies hereinafter) 3000, 5000, 9000, 11200, 12000, 13000, 13240, 13650, 13940, 16000, 17000, 18000, 20000, 21000, 24000SC, 24000GR, 26000, 27000, 28000, 31845, 32000, 32500, 32550, 32600, 33000, 33500, 34750, 35100, 35200, 36600, 37500, 38500, 39000, 41000, 41090, 53095, 55000, 56000, 71000, 76500, J180, J200, M387, etc., SOLPLUS (registered trademark) (hereinafter the same) D510, D520, D530, D540, DP310, K500, L300, L400, R700, etc., manufactured by Japan Lubrizol Corporation; Disperbyk (registered trademark) (the same applies hereinafter)—101, 102, 103, 106, 107, 108, 109, 110, 111, 112, 116, 130, 140, 142, 145, 154, 161, 162, 163, 164, 165, 166, 167, 168, 170, 171, 174, 180, 181, 182, 183, 184, 185, 190, 191, 192, 2000, 2001, 2009, 2020, 2025, 2050, 2070, 2095, 2096, 2150, 2151, 2152, 2155, 2163, 2164. Anti-Terra (registered trademark) (the same applies hereinafter)—U, 203, 204 etc.; BYK (registered trademark) (the same applies hereinafter)—P104, P104S, P105, P9050, P9051, P9060, P9065, P9080, 051, 052, 053, 054, 055, 057, 063, 065, 066N, 067A, 077, 088, 141, 220S, 300, 302, 306, 307, 310, 315, 320, 322, 323, 325, 330, 331, 333, 337, 340, 345, 346, 347, 348, 350, 354, 355, 358N, 361N, 370, 375, 377, 378, 380N, 381, 392, 410, 425, 430, 1752, 4510, 6919, 9076, 9077, W909, W935, W940, W961, W966, W969, W972, W980, W985, W995, W996, W9010, Dynwet800, Silicon3700, UV3500, UV3510, UV3570, etc. manufactured by Big Chemie Japan; EFKA (registered trademark) (the same applies hereinafter) 2020, 2025, 3030, 3031, 3236, 4008, 4009, 4010, 4015, 4020, 4046, 4047, 4050, 4055, 4060, 4080, 4300, 4310, 4320, 4330, 4340, 4400, 4401, 4402, 4403, 4500, 5066, 5220, 6220, 6225, 6230, 6700, 6780, 6782, 7462, 8503, etc., manufactured by Ffka Additives; JONCRYL (registered trademark) (the same applies hereinafter) 67, 678, 586, 611, 680, 682, 690, 819, -JDX5050, etc., manufactured by BASF Japan; TERPLUS (registered trademark) (the same applies hereinafter) MD1000, D1180, D1130, etc. manufactured by Otsuka Chemical Co., Ltd.; Addispar (registered trademark) (the same applies hereinafter) PB-711, PB-821, PB-822, etc. manufactured by Ajinomoto Fine Techno; Dispalon (registered trademark) (hereinafter the same) 1751N, 1831, 1850, 1860, 1934, DA-400N, DA-703-50, DA-325, DA-375, DA-550, DA-705, DA-725, DA-1401, DA-7301, DN-900, NS-5210, NVI-8514L, etc., manufactured by Kusumoto Chemicals; Alphon (registered trademark) (hereinafter the same) UC-3000, UF-5022, UG-4010, UG-4035, UG-4070, etc., manufactured by Toagosei Co.

The dispersant having any of the functional groups described above includes specifically for example: an acrylic dispersant having a functional group containing an amine-containing group, and an acrylic-styrene copolymer-based dispersant having a carboxyl group as a functional group, and the like.

Further, in the dispersant having the amine-containing group in the functional group, molecular weight Mw is preferably 2000 or more and 200,000 or less. In the dispersant having the amine-containing group in the functional group, an amine value is preferably 5 mgKOH/g or more and 100 mgKOH/g or less.

On the other hand, in the dispersant having the carboxyl group as a functional group, the molecular weight Mw is preferably 2000 or more and 200,000 or less. In the dispersant having the carboxyl group, an acid value is preferably 1 mgKOH/g or more and 100 mgKOH/g or less.

The content of the dispersant in the adhesive layer according to the present invention is not particularly limited, but for example the content of the dispersant is preferably 10 parts by mass or more and 1000 parts by mass or less, and more preferably 30 parts by mass or more and 400 parts by mass or less, based on 100 parts by mass of the composite tungsten oxide fine particles.

This is because when the content of the dispersant is within the above range, the composite tungsten oxide fine particles can be more reliably and uniformly dispersed in the adhesive, the transparency of the obtained adhesive layer can be enhanced, and the near-infrared absorption effect can be enhanced.

Note that when the adhesive layer contains the composite tungsten oxide fine particles, the content of the dispersant based on 100 parts by mass of the total content of both fine particles contained in the adhesive layer, preferably satisfies the above range.

(2) Crosslinking Agent

The adhesive layer according to the present invention may contain a crosslinking agent. By containing the crosslinking agent, the adhesive can be cross-linked, and the adhesives can be polymerized and brought into close contact with each other. Further, the weight-average molecular weight of the sol component in the adhesive layer can be adjusted.

The crosslinking agent is not particularly limited, and can be optionally selected, for example, in accordance with materials or the like of the adhesive. For example, one or more selected from a polyfunctional melamine compound (melamine-based crosslinking agent), a polyfunctional isocyanate compound (isocyanate-based crosslinking agent), a polyfunctional epoxy compound (epoxy-based crosslinking agent) and the like can be preferably used as the crosslinking agent. Among them, one or more selected from isocyanate-based crosslinking agents and epoxy-based crosslinking agents can be more preferably used. The crosslinking agent can be used alone, or two or more types may be used in combination.

Examples of the above-described melamine-based crosslinking agent include methylated trimethylol melamine, butylated hexamethylol melamine or the like.

Further, examples of the above-described isocyanate-based crosslinking agent include lower aliphatic polyisocyanates such as 1,2-ethylene diisocyanate, 1,4-butylene diisocyanate or 1,6-hexamethylene diisocyanate; alicyclic polyisocyanates such as cyclopentylene diisocyanate, cyclohexylene diisocyanate, isophorone diisocyanate, hydrogenated tolylene diisocyanate or hydrogenated xylene diisocyanate; aromatic polyisocyanates such as 2,4-tolylene diisocyanate, 2,6-tolylene diisocyanate, 4,4'-diphenyl methane diisocyanate or xylylene diisocyanate, or the like. In addition, trimethylolpropane/tolylene diisocyanate adduct (for example, product name "CORONATE L", produced by Nippon Polyurethane Industry Co., Ltd.), trimethylolpropane/hexamethylene diisocyanate adduct (for example, product name "CORONATE HL", produced by Nippon Polyurethane Industry Co., Ltd.) or the like may be exemplified as well.

Further, examples of the above-described epoxy-based crosslinking agent include epoxy-based resin having two or more epoxy groups in a molecule or the like, in addition to N,N,N',N'-tetraglycidyl-m-xylene diamine, diglycidyl aniline, 1,3-bis(N,N-diglycidyl aminomethyl)cyclohexane, 1,6-hexanedioldiglycidyl ether, neo-pentylglycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylol propanepolyglycidyl ether, adipic acid diglycidyl ester, o-phthalic acid diglycidyl ester, triglycidyl-tris(2-hydroxyethyl)isocyanurate, resorcin diglycidyl ether and bisphenol-S-diglycidyl ether. Examples of a commercially available product include product name "TETRAD C" produced by MITSUBISHI GAS CHEMICAL COMPANY, INC. or the like.

The content of the crosslinking agent of the adhesive layer according to the present invention is not particularly limited, but for example, is generally preferably 0.001 part by mass or more and 20 parts by mass or less, and more preferably 0.01 part by mass or more and 10 parts by mass or less, based on 100 parts by mass of the adhesive.

Especially, when the isocyanate-based crosslinking agent is used as the crosslinking agent, the content of the isocyanate-based crosslinking agent is preferably 0.01 part by mass or more and 20 parts by mass or less, and more preferably 0.01 part by mass or more and 3 parts by mass or less, based on 100 parts by mass of the adhesive.

Further, when the epoxy-based crosslinking agent is used, the usage amount of the epoxy-based crosslinking agent is preferably 0.001 part by mass or more and 5 parts by mass or less, and more preferably 0.01 part by mass or more and 5 parts by mass or less, based on 100 parts by mass of the adhesive.

(3) Ultraviolet Absorber

As described above, the composite tungsten oxide particles are added to the adhesive layer of the present invention, and therefore transmission of light mainly in the near-infrared region is suppressed. As a result, a temperature rise in a region arranged inside the adhesive layer can be suppressed. Also, since the adhesive layer according to the present invention further contains an ultraviolet absorber, the light in the ultraviolet region can be further cut, and the effect of suppressing the temperature rise in the region arranged inside the adhesive layer can be particularly enhanced.

Further, since the adhesive layer according to the present invention contains an ultraviolet absorber, effects of ultraviolet rays on people and interiors, sunburn, deterioration of furniture and interiors, etc., in a car or inside a building that has a window with a near-infrared absorbing film containing the adhesive layer, can be suppressed.

Further, in the adhesive layer in which the composite tungsten oxide fine particles are dispersed in the adhesive, with long-term exposure to strong ultraviolet rays, a light-coloring phenomenon may occur due to a decrease in the visible light transmittance of the composite tungsten oxide fine particles. However, since the adhesive layer according to the present invention contains an ultraviolet absorber, the occurrence of the light-coloring phenomenon can be suppressed.

The ultraviolet absorber is not particularly limited, and can be optionally selected depending on the influence on the near-infrared absorption performance and visible light transmittance of the adhesive layer, ultraviolet absorbing ability, durability, etc. The ultraviolet absorber includes: an organic UV absorber such as benzotriazole compounds, benzophenone compounds, salicylic acid compounds, triazine compound, benzotriazolyl compound, benzoyl compound; and inorganic UV absorbers such as zinc oxide, titanium oxide, cerium oxide, etc. Among them, the ultraviolet absorber preferably contains at least one selected from benzotriazole compounds and benzophenone compounds. This is because the benzotriazole compounds and benzophenone compounds can secure the visible light transmittance of the adhesive layer to a very high level, and has high durability against long-term exposure to strong ultraviolet rays, even when added to a concentration sufficient to absorb ultraviolet rays.

Further, the ultraviolet absorber more preferably contains a compound represented by the following chemical formula 1 and/or chemical formula 2.

[Chemical Formula 1]

(Chemical Formula 1)

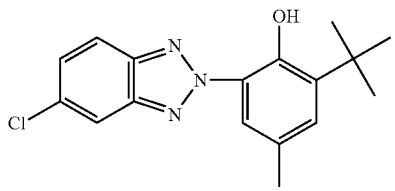

[Chemical Formula 2]

(Chemical Formula 2)

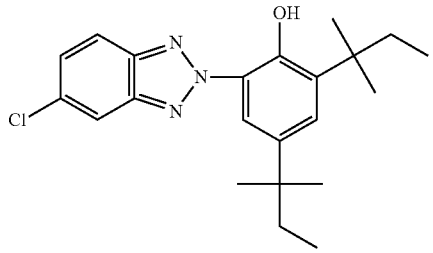

The content of the ultraviolet absorber of the adhesive layer is not particularly limited, and can be optionally selected, depending on the near-infrared absorption performance, visible light transmittance, ultraviolet absorbing ability, etc., which are required for the adhesive layer. The content (content rate) of the ultraviolet absorber in the adhesive layer is preferably, for example, 0.02 mass % or more and 5.0 mass % or less. This is because when the content of the ultraviolet absorber is 0.02 mass % or more, it can fully absorb light in the ultraviolet region that cannot be completely absorbed by the composite tungsten oxide particles. Also, this is because when the content is 5.0 mass % or less, the ultraviolet absorber is more reliably prevented from depositing in the adhesive layer, and the transparency or design of the adhesive layer is not significantly affected.

(4) Light Stabilizer

The adhesive layer according to the present invention can further contain hindered amine light stabilizer (may be described as "HALS" in the present invention).

As described above, since the adhesive layer according to the present invention contains an ultraviolet absorber, UV absorbing ability can be enhanced in the adhesive layer according to the present invention, and in the near-infrared absorbing film containing the adhesive layer, etc. However, the UV absorber may deteriorate with use for a long time and the UV absorbing ability may decrease, in an environment of practical use of the adhesive layer according to the present invention, the near-infrared absorbing film containing the adhesive layer and the like, or depending on the type of the UV absorber.

On the other hand, the adhesive layer according to the present invention contains HALS, which contributes to prevent deterioration of the UV absorber and the maintenance of the UV absorbing ability of the adhesive layer of the present embodiment and the near-infrared absorbing film including the adhesive layer.

Further, as described above, the visible light transmittance may decrease due to long-term exposure to strong ultraviolet rays, and the light-coloring phenomenon may occur in the adhesive layer in which the composite tungsten oxide fine particles are dispersed in the adhesive. However, by containing HALS in the adhesive layer according to the present invention, occurrence of the light-coloring phenomenon can be suppressed similarly to a case where the ultraviolet absorber or the metal coupling agent having an amino group is contained.

Note that the effect of suppressing the light-coloring phenomenon by containing HALS in the adhesive layer according to the present invention is based on a mechanism that is clearly different from the effect of suppressing the light-coloring phenomenon by adding the metal coupling agent having an amino group.

Accordingly, the effect of suppressing the light-coloring phenomenon by adding HALS, and the effect of suppressing the light-coloring phenomenon by adding the metal coupling agent having an amino group, do not mutually contradict/interfere with each other, but rather work synergistically and can effectively suppress the light-coloring phenomenon.

Further, there are compounds in HALS that have an ability to absorb ultraviolet rays. In this case, it is possible to have both the effect of adding the ultraviolet absorber and the effect of adding HALS as described above, depending on the addition of the HALS compound.

HALS is not particularly limited, and can be optionally selected, depending on the effect on the near-infrared absorption performance and visible light transmittance of the adhesive layer, compatibility with UV absorber, durability, etc.

As the HALS, for example, bis(2,2,6,6-tetramethyl-4-piperidyl)sebacate, bis(1,2,2,6,6-pentamethyl-4-piperidyl) sebacate, 1-[2-[3-(3,5-t-butyl-4-hydroxyphenyl)propionyloxy]ethyl]-4-[3-(3,5-di-t-butyl-4-hydroxyphenyl) propionyloxy]-2,2,6,6-tetramethylpiperidine, 4-benzoyloxy-2,2,6,6-tetramethylpiperidine, 8-acetyl-3-dodecyl-7,7,9,9-tetramethyl-1,3,8-triazaspiro[4,5]decane-2,4-di one, bis-(1,2,2,6,6-pentamethyl-4-piperidyl)-2-(3,5-di-t- butyl-4-hydroxybenzyl)-2-n-butylmalonate, tetrakis(1,2,2,6,6-pentamethyl-4-piperidyl)-1,2,3,4-butanetetracarboxylate, tetrakis(2,2,6,6-tetramethyl-4-piperidyl)-1,2,3,4-butanetetracarboxylate, (Mixed 1,2,2,6,6-pentamethyl-4-piperidyl/tridecyl)-1,2,3,4-butanetetracarboxylate, Mixed {1,2,2,6,6-pentamethyl-4-piperidyl/β,β,β',β'-tetramethyl-3,9-[2,4,8,10-tetra oxaspiro(5,5)undecane]diethyl}-1,2,3,4-butanetetracarboxylate, (Mixed 2,2,6,6-tetramethyl-4-piperidyl/tridecyl)-1,2,3,4-butanetetracarboxylate, Mixed {2,2,6,6-tetramethyl-4-piperidyl/β,β,β',β'-tetramethyl-3,9-[2,4,8,10-tetraoxaspiro(5,5)undecane]diethyl}-1,2,3,4-butanetetracarboxylate, 2,2,6,6-tetramethyl-4-piperidyl methacrylate, 1,2,2,6,6-pentamethyl-4-piperidyl methacrylate, poly[(6-(1,1,3,3-tetramethylbutyl)imino-1,3,5-triazine-2,4-diyl)][(2,2,6,6-tetramethyl-4-piperidyl)imino]hexamethylene [(2,2,6,6-tetramethyl-4-piperidyl)iminol], a polymer of succinic acid dimethyl and 4-hydroxy-2,2,6,6-tetramethyl-1-piperidineethanol, N,N',N",N"'-tetrakis-(4,6-bis-(butyl-(N-methyl-2,2,6,6-tetramethylpiperidine-4-yl)amino)-triazine-2-yl)-4,7-diazadecane-1,10-diamine, a condensation polymer of dibutylamine-1,3,5-triazine-N,N'-bis(2,2,6,6-tetramethyl-4-piperidyl-1,6-hexamethylene diamine and N-(2,2,6,6-tetramethylpiperidyl)butylamine, decanedioicacid bis (2,2,6,6-tetramethyl-1-(octyloxy)-4-piperidinyl) ester or the like may be preferably used.

The content of HALS in the adhesive layer is not particularly limited, and can be optionally selected in accordance with the visible light transmittance, the weather resistance and the like required in the adhesive layer. The content (content percentage) of HALS in the adhesive layer is preferably, for example, 0.05 mass % or more and 5.0 mass % or less. This is because if the content of the HALS in the adhesive layer is 0.05 mass % or more, the effect due to the addition of HALS can be sufficiently exhibited in the adhesive layer. Further, if the content is 5.0 mass % or less, the deposition of the HALS on the adhesive layer can be reliably prevented, and the transparency or the design of the adhesive layer is not largely affected.

(5) Antioxidant

Further, the adhesive layer according to the present invention may further contain an antioxidant (oxidation inhibitor).

By containing the antioxidant in the adhesive layer, an oxidation degradation of the adhesive contained in the adhesive layer can be suppressed, and the weather resistance of the adhesive layer can be further improved. Further, the oxidation degradation of the other additives contained in the adhesive such as the composite tungsten oxide, the tungsten oxide, the metal coupling agent having an amino group, the ultraviolet absorber, the HALS and the like can be suppressed, and the weather resistance can be improved.

The antioxidant is not particularly limited, and can be optionally selected in accordance with an affect on the visible light transmittance of the adhesive layer, desired weather resistance and the like.

For example, a phenol-based antioxidant, a sulfur-based antioxidant, a phosphorus-based antioxidant or the like may be preferably used. Specifically, 2,6-di-t-butyl-p-cresol, butylated hydroxyanisole, 2,6-di-t-butyl-4-ethylphenol, stearyl--(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate]methane, 1,3,3-tris-(2-methyl-4-hydroxy-5-t-butylphenol)butane, 1,3,5-trimethyl-2,4,6-tris (3,5-di-t-butyl-4-hydroxybenzyl)benzene, bis(3,3'-t-butylphenol)butyric acid glycol ester, isooctyl-3-(3,5-di-t-butyl-4-hydroxyphenyl)propionate or the like may be preferably used as the antioxidant.

The content of the antioxidant in the adhesive layer is not particularly limited, and can be optionally selected in accordance with the visible light transmittance, the weather resistance and the like required in the adhesive layer. The content (content percentage) of the antioxidant in the adhesive layer is preferably, for example, 0.05 mass % or more and 5.0 mass % or less. This is because if the content of the antioxidant is 0.05 mass % or more, the effect due to the addition of the antioxidant can be sufficiently exhibited in the adhesive layer. Further, if the content is 5.0 mass % or less, the deposition of the antioxidant on the adhesive layer can be reliably prevented, and the transparency or the design of the adhesive layer is not largely affected.

(6) Other Additives

As components other than the above-described dispersant, crosslinking agent, ultraviolet absorber, light stabilizer, and antioxidant, and components that can be optionally added to the adhesive layer according to the present invention, a surfactant, an antistatic agent, etc. can also be contained.

[f] A Solvent

Various organic solvents can be used as the solvent contained in the adhesive composition according to the present invention.

The organic solvent is added as a solvent for mixing the components included in the adhesive composition according to the present invention, and materials having a low reactivity with each of the components contained in the adhesive composition according to the present invention is preferably used.

As the organic solvent, for example, various types of solvents such as alcohol-based solvents, ketone-based solvents, ester-based solvents, glycol-based solvents, glycol ether-based solvents, amido-based solvents, hydrocarbon-based solvents, halogen-based solvents and the like may be selected. Specifically, an alcohol-based solvent such as methanol, ethanol, 1-propanol, isopropanol, butanol, pentanol, benzylalcohol, diacetonealcohol, isopropylalcohol or 1-methoxy-2-propanol; a ketone-based solvent such as acetone, methylethylketone, methylpropylketone, methylisobutylketone, cyclohexanone, isophorone or dimethylketone; an ester-based solvent such as 3-methyl-methoxypropionate, n-butyl acetate, ethyl acetate, propylene glycol monomethyletheracetate or propylene glycol ethyletheracetate; a glycol-based solvent such as ethylene glycol, diethylene glycol, triethylene glycol or propylene glycol; a glycolether-based solvent such as ethylene glycol monomethylether, ethylene glycol monoethylether, ethylene glycol monobutylether, diethylene glycol monoethylether, diethylene glycol monobutylether, diethylene glycol monomethylether, propylene glycol monomethylether or 3-methoxy-3-methyl-1-butanol; an amido-based solvent such as formamido, N-methylformamido, dimethylformamido, dimethylacetamido or N-methyl-2-pyrrolidone; a hydrocarbon-based solvent such as toluene, xylene or solvent naphtha; a halogen-based solvent such as ethylene chloride or chlorobenzene, or the like may be exemplified.

Among them, specifically, isopropylalcohol, ethanol, 1-methoxy-2-propanol, dimethylketone, methylethylketone, methylisobutylketone, toluene, propylene glycol monomethyletheracetate, n-butyl acetate or the like are more preferable. These organic solvents may be used alone, or two or more types may be used in combination.

The concentration of the organic solvent in the adhesive composition is not particularly limited, but is preferably 10 mass % or more and 90 mass % or less. By setting the concentration of organic solvent to 10 mass % or more, the adhesive composition can have a viscosity that is particularly suitable for handling. On the other hand, by setting the concentration of the organic solvent to excess of 90 mass % or less, the amount of the organic solvent to be removed during drying increases, thus, there is a risk that a production cost increases. Thus, the concentration of the organic solvent in the adhesive composition is preferably 90 mass % or less.

Note that when the organic solvent is contained in the adhesive or crosslinking agent added to the adhesive composition, and when calculating the concentration of the organic solvent in the adhesive composition, it is preferable that the amount of the organic solvent derived from the adhesive is also included in calculating the concentration of the organic solvent in the adhesive composition, and it is set in the above-described range.

[g] Production of an Adhesive Composition

The adhesive composition according to the present invention can be produced by weighing, mixing and dispersing the above-described components. The above-described components can be mixed all at once, or can be mixed for each part.

For example, the composite tungsten oxide fine particles, the dispersant, and the organic solvent can be mixed to form a first dispersion liquid.

A dispersion method of the composite tungsten oxide fine particles in producing the first dispersion liquid is not particularly limited, as long as the fine particles can be uniformly dispersed in the first dispersion liquid without aggregation.

The dispersion method includes a dispersion treatment method using, for example, equipment such as bead mill, ball mill, sand mill, paint shaker, ultrasonic homogenizer, etc. Among them, the dispersion method to pulverize and disperse with a medium stirring mill such as a bead mill, ball mill, sand mill, paint shaker, etc., using medium media (beads, balls, Ottawa sand) is preferable, due to high dispersive power and requiring a short time.

Further, in the case of pulverization and dispersion treatment using these media stirring mills, formation of the fine particles is accelerated due to collision of the composite tungsten oxide ultrafine particles and collision of media against the ultrafine particles simultaneously with the dispersion of the composite tungsten oxide ultrafine particles in the dispersion liquid, and the composite tungsten oxide ultrafine particles can be more finely pulverized and dispersed (namely, they are pulverized and dispersed).

Then, the degree of pulverization and dispersion of the composite tungsten oxide fine particles in the first dispersion liquid can be judged by measuring a size of the composite tungsten oxide fine particles in the dispersion liquid as the dispersed particle size obtained by a dynamic light scattering method.

Specifically, when the dispersed particle sizer of the composite tungsten oxide fine particles in the first dispersion liquid is 200 nm or less, light scattering due to the composite tungsten oxide fine particles in the obtained adhesive layer can be suppressed, and the transparency of the adhesive layer can be efficiently maintained in the visible region, and the visibility can be secured. The dispersed particle size is preferably 100 nm or less, more preferably 80 nm or less.

Subsequently, a second dispersion liquid can be formed by adding and mixing a metal coupling agent having an amino group to the obtained first dispersion liquid. Also, an adhesive composition can be formed as a third dispersion liquid, by further adding and mixing an adhesive, a crosslinking agent, and other additive components to/with the second dispersion liquid.

The means for obtaining the second dispersion liquid and the third dispersion liquid from the first dispersion liquid is not particularly limited, and a ball mill or a paint shaker can be used. Then, in a process of obtaining the second dispersion liquid and the third dispersion liquid from the first dispersion liquid, the composite tungsten oxide fine particles are not pulverized, and therefore the dispersed particle size of the composite tungsten oxide fine particles in the first dispersion liquid may be regarded as the dispersed particle size of the composite tungsten oxide fine particles in the adhesive composition.

There is sometimes a difference between the dispersed particle size of the composite tungsten oxide fine particles contained in the adhesive composition, and the dispersed particle size of the composite tungsten oxide fine particles contained in the adhesive layer obtained from the adhesive composition. This is because the composite tungsten oxide fine particles that have aggregated in the adhesive composition are loosened when processed into the adhesive layer.

According to the adhesive composition of the present invention as described above, cloudiness and gelation can be suppressed from occurring for several hours after production. Therefore, excellent workability can be obtained when forming the adhesive layer using the adhesive composition, and disposal due to cloudness and gelation can be suppressed, which is conventionally performed, and therefore economical efficiency can be enhanced.

Further, by using the adhesive composition according to the present invention, haze of the adhesive layer described below can be suppressed.

(B) Adhesive Layer

The adhesive layer according to the present invention is obtained by removing the solvent by molding the above-described adhesive composition, or after coating or molding the adhesive composition on a predetermined transparent substrate, and drying the same. However, the solvent may remain in the obtained adhesive layer.

Hereinafter, the adhesive layer will be described in an order of [a]properties of the adhesive layer, [b] transparent substrate.

[a] Properties of the Adhesive Layer

In the adhesive layer according to the present invention, the visible light transmittance and the solar radiation transmittance can be set in desired ranges by adjusting the added amount of the composite tungsten oxide fine particles contained therein.

The adhesive layer according to the present invention is required to have high transparency and high near-infrared absorbing ability. The transparency of the adhesive layer and the near-infrared absorbing ability, that is, the heat shielding property can be evaluated by measuring the visible light transmittance and the solar radiation transmittance respectively.

Transparency required for the adhesive layer according to the present invention and the degree of near-infrared absorbing ability are not particularly limited, and it is preferable that the adhesive layer has a performance according to the application and the like.

Specifically, for example, when used for applications such as window materials, the visible light transmittance is preferably high from a viewpoint of maintaining the transparency of light to the human eye, and the solar radiation transmittance is preferably low from a viewpoint of reducing the incidence of heat from sunlight.

More specifically, for example, when the near-infrared absorbing film containing the adhesive layer according to the present invention is used as a building material or an automobile window material, the adhesive layer preferably has a visible light transmittance of 70% or more and a solar radiation transmittance of 60% or less. Particularly, it is more preferable that the visible light transmittance is 70% or more and the solar radiation transmittance is 50% or less, and it is further preferable that the visible light transmittance is 70% or more and the solar radiation transmittance is 40% or less.

Note that the visible light transmittance and the solar radiation transmittance are specified in JIS R 3106 (1998).

[b] Transparent Substrate

The transparent substrate for applying the adhesive layer according to the present invention is preferably a substrate having high transparency, and a haze evaluated based on JIS K 7136 (2000) is, for example, preferably 1.5% or less, more preferably 1.0% or less.

The transparent substrate is not particularly limited, but, examples thereof include a plastic substrate made of a plastic material such as a polyester-based resin such as polyethylene terephthalate (PET); an acrylic-based resin such as polymethyl methacrylate (PMMA); polycarbonate resin; triacetylcellulose (TAC); polysulfone; polyarylate; polyimido; polyvinyl chloride; polyvinyl acetate; olefin-based resin such as polyethylene, polypropylene, ethylene-propylene copolymer, cycloolefin-based polymer (for example, product name "ARTON" (produced by JSR Corporation), product name "ZEONOR" (produced by ZEON Corporation)), or the like.

Note that, an embodiment of the plastic substrate is not particularly limited, but, for example, a plastic film or a plastic sheet may be exemplified. However, the above-described plastic material may be used alone, or two or more types may be used in combination.

Further, a glass substrate made of a glass material, in other words, a glass plate or the like may also be used as the transparent substrate. However, the plastic substrate made of a plastic material is preferably used as the transparent substrate, from a viewpoint of handling performance or the like.

The thickness of the transparent substrate can be arbitrarily selected in accordance with the material of the transparent substrate, and is not particularly limited, but for example, when the transparent substrate is a plastic substrate, the thickness is preferably 3 µm or more. This is because when the transparent substrate is a plastic substrate, a sufficient strength can be obtained by setting the thickness to 3 µm or more, and when the near-infrared absorbing film including the plastic substrate and the adhesive layer is adhered to a window or the like, the plastic substrate or the like can be suppressed from being broken.

On the other hand, an upper limit of the thickness of the plastic substrate is not particularly limited, but in consideration of the handling performance and the like, the thickness is preferably 100 µm or less.

Further, when the transparent substrate is a glass substrate, the thickness of the glass substrate is preferably 1 mm or more. This is because a sufficient strength can be obtained by setting the thickness of the glass substrate to 1 mm or more, when the near-infrared absorbing film including the glass substrate and the adhesive layer is adhered to a window or the like, the glass substrate or the like can be suppressed from being broken.

On the other hand, an upper limit value of the thickness when the transparent substrate is the glass substrate is not particularly limited, but for example, is preferably 5 mm or less. This is because when the thickness of the glass substrate is in excess of 5 mm, there are the problems that weight increases, and the handling performance decreases.

Note that the transparent substrate may be formed from a single layer or a plurality of layers, and when the transparent substrate is made of a plurality of layers, each of the layers is preferably in the above-described range.

Further, the surface of the transparent substrate may be subjected to surface treatment such as physical treatment such as corona discharge treatment and plasma treatment, and chemical treatment such as undercoating treatment.

[2] A Near-Infrared Absorbing Film

A configuration example of the near-infrared absorbing film according to the present invention will be described.

The near-infrared absorbing film according to the present invention may have, for example, the transparent film and the above-described adhesive layer.

The transparent film is not particularly limited, but the above-described transparent substrate can be suitably used.

The transparent film has two front and back surfaces, and can have the above-described adhesive layer on one surface side, for example.

In this way, by using the near-infrared absorbing film having the adhesive layer arranged on one surface side of the transparent film, the composite tungsten oxide particles contained in the adhesive layer are not exposed to air when the near-infrared absorbing film is adhered to a window or the like. As a result, even when left under a severe environment of high temperature and high humidity for a long period of time, fading of the near-infrared absorbing film due to oxidization of the composite tungsten oxide particles can be suppressed.

The near-infrared absorbing film according to the present invention may have an optional layer other than the above-described transparent film and the adhesive layer. The near-infrared absorbing film according to the present invention may, for example, have a hard coat layer.

In this case, the near-infrared absorbing film can be provided with an adhesive layer on one side and a hard coat layer on the other side. By thus providing the hard coat layer on the near-infrared absorbing film, it is possible to prevent the exposed surface of the near-infrared absorbing film from being scratched.

The material of the hard coat layer is not particularly limited, but preferably has high transparency, and, for example, may be formed by an ultraviolet curable resin or the like. For example, the hard coat layer can be obtained by applying an ultraviolet curable resin on a transparent film and curing it by irradiating with ultraviolet rays.

It is preferable that the hard coat layer does not contain composite tungsten oxide fine particles. This is because the composite tungsten oxide particles contained in the hard coat layer may be exposed to the air, and the visible light transmittance may decrease due to oxidation.

Further, since the near-infrared absorbing film according to the present invention has a low haze value, it exhibits excellent properties as an infrared cut filter.

[3] A Laminated Structure

A configuration example of a laminated structure according to the present invention will be described.

The laminated structure according to the present invention includes an adhesive layer and a plurality of transparent films. Moreover, the plurality of transparent films and the adhesive layer may be arranged to be in parallel with each other, and the adhesive layer may be arranged between the plurality of transparent films.

Figure 2:
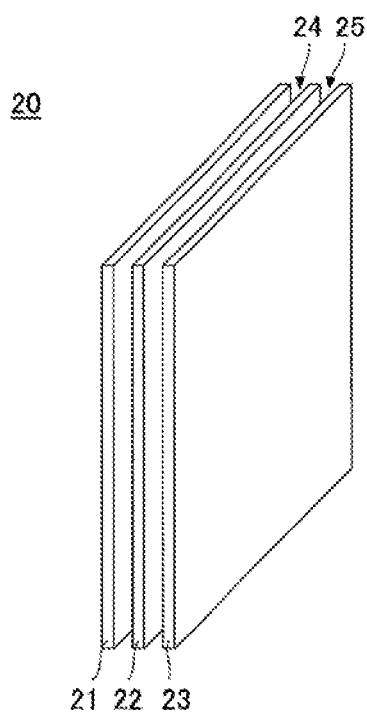
FIG. 2 is a conceptual diagram of a laminated structure according to the present invention.

The laminated structure according to the present invention will be described with reference to FIG. 2. FIG. 2 illustrates a perspective view of a laminated structure 20 of this embodiment.

The laminated structure 20 has a plurality of transparent films 21, 22, and 23. Note that FIG. 2 illustrates an example using three transparent films 21 to 23, but the laminated structure is not limited thereto, and two or four or more transparent films may be acceptable.

Note that the transparent film is not particularly limited, and the transparent substrate described in the section of the adhesive layer can be used. Further, the plurality of transparent films 21 to 23 can be arranged so that their main surfaces are parallel to each other.

The adhesive layer (not illustrated) can be arranged so as to be parallel to the plurality of transparent films 21 to 23. And the adhesive layer can be arranged between the transparent films 24 and 25.

Note that the number of adhesive layers included in the laminated structure is not particularly limited, and can be provided in accordance with the number of spaces between the plurality of transparent films, in other words, the number of transparent films. For example, the case of the laminated structure 20 illustrated in FIG. 2 has spaces between the transparent films 24 and 25. Thus, an adhesive layer can be provided between both spaces between the transparent films 24 and 25. Further, the adhesive layer can be provided in only one of the spaces between transparent film 24 or transparent film 25. That is, the adhesive layer may be arranged at one or more selected spaces between the transparent films, among the spaces between the transparent films.

When there is a space in which the adhesive layer is not arranged, among the spaces between the transparent films included in the laminated structure, the structure of the space is not particularly limited. For example, an ultraviolet ray absorbing film, an adhesive layer having a different structure, or the like may be arranged.

For example, by taking the structure of the laminated structure 20 illustrated in FIG. 2, it is possible to form a structure in which the adhesive layer is arranged between transparent films, and it is possible to form a structure in which the composite tungsten oxide fine particles contained in the adhesive layer are not exposed to the air. Therefore, even when exposed to a severe atmosphere of high temperature and high humidity for a long period of time, it is possible to suppress fading of the near-infrared absorbing film due to the oxidation of the composite tungsten oxide fine particles.

[4] Laminated Body

A configuration example of the laminated body according to the present invention will be described.

The laminated body according to the present invention forms a transparent film including a glass plate arranged on the one surface side of the adhesive layer, and hard coat layer arranged on an opposite side of the one surface of the adhesive layer.

Figure 3:
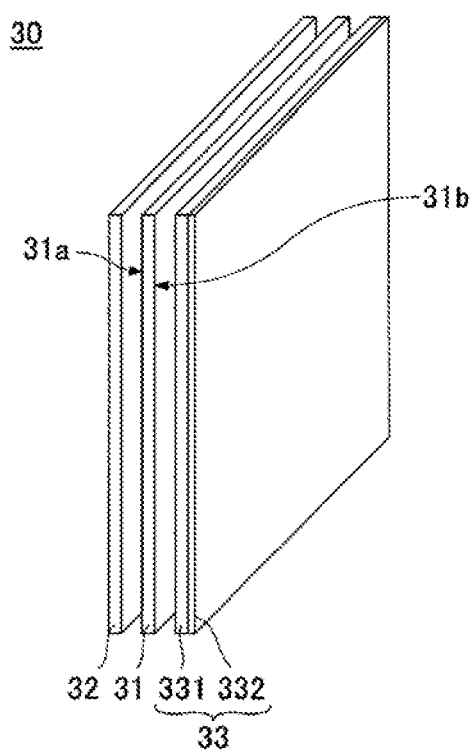
FIG. 3 is a conceptual diagram of a laminated body according to the present invention.

The laminated body according to the present invention will be described with reference to FIG. 3. FIG. 3 is a perspective view of a laminated body 30 according to the present invention.

Note that in FIG. 3, layers are shown separated for easy understanding of a layer structure of the laminated body 30. Actually, the respective layers constituting the laminated body 30 are in a laminated and adhered state.

The laminated body 30 includes an adhesive layer 31. Then, a glass plate 32 is arranged on the one surface 31a side of the adhesive layer 31. Further, a transparent film 33 with a hard coat layer is arranged on the opposite side (the other surface side) 31b of the one surface 31a of the adhesive layer 31.

Note that the transparent film 33 with a hard coat layer may have a structure in which a hard coat layer 332 is arranged on a surface of a transparent film 331. Among the surface of the transparent film 331, the surface on which the hard coat layer 332 is arranged, is preferably arranged on the opposite side of the surface facing the adhesive layer 31. This is because the hard coat layer 332 can prevent the surface of the transparent film 331 from being scratched, thus, the hard coat layer 332 is preferably arranged on a surface of the exposed side of the transparent film 331.

Note that the transparent film is not particularly limited, but the transparent substrate described above for the adhesive layer can be used.

The laminated body illustrated in FIG. 3 may be formed by, for example, forming a near-infrared shielding film by the adhesive layer 31 and the transparent film 33 with the hard coat layer, and then adhering the near-infrared shielding film on a window glass or the like.

The laminated body according to the present invention preferably has a visible light transmittance of 70% or more, and a solar radiation transmittance of 60% or less. Specifically, the laminated body according to the present invention more preferably has a visible light transmittance of 70% or more, and a solar radiation transmittance of 50% or less, and even more preferably has a visible light transmittance of 70% or more, and a solar radiation transmittance of 40% or less.

Note that the method for measuring the visible light transmittance is specified in JIS R 3106 (1998). Further, the haze value can be measured and evaluated based on JIS K7136 (2000).

On the other hand, by taking the structure of the laminated body 30 illustrated in FIG. 3, it is possible to form a structure in which the adhesive layer is arranged between the transparent film with a hard coat layer, and the glass plate. As a result, it is possible to form a structure in which the composite tungsten oxide fine particles contained in the adhesive layer are not exposed to the air. Therefore, even when the laminated body is exposed to a severe atmosphere of a high temperature and high humidity for a long period of time, it is possible to suppress the fading of the near-infrared absorbing film due to the oxidation of the composite tungsten oxide fine particles.

The weather resistance of the laminated body can be evaluated, by performing a wet heat test on the laminated body, and evaluating the variation of the total light transmittance in the visible light wavelength range before and after the wet heat test. Note that the wet heat test refers to a test which maintains the laminated body under high temperature and high humidity, and for example, the test may be performed by maintaining under an environment of a temperature of 85° C., and relative humidity of 90% for seven days.

The laminated body according to the present invention preferably has 1.0% or less absolute value of a difference in a total light transmittance in the visible light wavelength region before and after the wet heat test. This is because when the absolute value of the difference in the total light transmittance in the visible light wavelength region before and after the wet heat test is 1.0% or less, it means that the fading of the near-infrared absorbing film due to the oxidation of the composite tungsten oxide fine particles can be suppressed, and the weather resistance is excellent.

Note that, the total light transmittance in the visible light wavelength region can be measured based on JIS K 7361-1 (1997).

EXAMPLES

The present invention will be specifically described below with reference to examples. However, the present invention is not limited to the following examples.

First, a test method of each evaluation item will be described.

(Crystal Structure, Lattice Constant, Crystallite Size of Composite Tungsten Oxide Particles)

A solvent is removed from a composite tungsten oxide fine particle dispersion liquid to obtain composite tungsten oxide fine particles. Then, an X-ray diffraction pattern of the composite tungsten oxide fine particles was measured by powder X-ray diffraction method (θ-2θ method) using a powder X-ray diffractometer (Spectras Co., Ltd. PANalytical X'Pert-PRO/MPD). The crystal structure contained in the fine particles was specified from the obtained X-ray diffraction pattern. Further, a lattice constant and a crystallite size were calculated using the Rietveld method.

(Dispersed Particle Size of the Composite Tungsten Oxide Particles)

For the dispersed particle size of the composite tungsten oxide particles in the particle dispersion liquid, a fluctuation of a scattered light of a laser was observed using ELS-8000 manufactured by Otsuka Electronics Co., Ltd., and an auto-correlation function was obtained by a dynamic light scattering method (photon correlation method), and an average particle size (hydrodynamic diameter) was calculated by a cumulant method.

(Average Particle Size of the Composite Tungsten Oxide Fine Particles in the Adhesive Layer)

An average particle size of the composite tungsten oxide fine particles dispersed in the adhesive layer was measured by observing a transmission electron microscope image of a cross section of the adhesive layer. The transmission electron microscope image was observed using a transmission electron microscope (HF-2200 manufactured by Hitachi High-Technologies Corporation). The transmission electron microscope image was processed by an image processing device, and the particle size of 100 composite tungsten oxide particles was measured, and an average value was taken as an average particle size.

(Optical Properties of a Laminated Body)

For a laminated body formed by attaching a near-infrared ray absorbing film to a glass plate having a thickness of 3 mm, a visible light transmittance, a transmittance at a wavelength of 500 nm, a transmittance at a wavelength of 1000 nm, a transmittance at a wavelength of 1500 nm, and a haze, which will be described later, were evaluated.

Note that the near-infrared absorbing film has a structure in which an adhesive layer and a transparent film with a hard coat layer are laminated. Therefore, the laminated body formed by adhering the near-infrared absorbing film to a glass plate has the same structure as the laminated body illustrated in FIG. 2.

Namely, as illustrated in FIG. 2, a laminated body 30 has a structure in which a glass plate 32 having a thickness of 3 mm, an adhesive layer 31, and a transparent film 33 with a hard coat layer are laminated. Note that the transparent film 33 with a hard coat layer has a structure in which a hard coat layer 332 is arranged on the surface of the transparent film 331 opposite to the surface facing the adhesive layer 31.

(Haze Value of the Laminated Body)

The haze value of the laminated body having the near-infrared absorbing film was measured using a haze/transmittance meter (Model: HM-150, manufactured by Murakami Color Research Laboratory Co., Ltd.), based on JIS K 7361-1 (1997). JIS K 7136 (2000).

When the haze value of the laminated body having the near-infrared absorbing film is 1.5% or less, it can be said that the laminated body has sufficient optical properties.

Note that the transmittance is measured before and after the wet heat test.

(Transmittance)

The transmittance of the laminated body having the near-infrared absorbing film was measured using a spectrophotometer (Model: U-4100 manufactured by Hitachi. Ltd.).

(Wet Heat Test)

The weather resistance of the laminated body having the near-infrared absorbing film was confirmed by measuring a total light transmittance of the laminated body before and after performing the wet heat test, and calculating a difference value. Namely, it is judged that the smaller the difference in total light transmittance of the laminate having the near-infrared absorbing film before and after performing the wet heat test, the better the wet heat resistance. Specifically, it can be said that the laminated body has a sufficient weather resistance when the difference in total light transmittance of the laminated body having the near-infrared absorbing film before and after the wet heat test is 1.0% or less.

The wet heat test was performed by exposing the laminated body having the near-infrared absorbing film to an environment of a temperature of 85° C., and a relative humidity of 90% for 7 days.

(Stability of the Adhesive Composition)

Stability of the adhesive composition was judged by visual evaluation of the adhesive composition left standing for 12 hours after its preparation. The stability was judged to be good when no gelling, cloudiness, or aggregation or precipitation of the composite tungsten oxide fine particles was observed in the adhesive composition.

Example 1

A solution was obtained by dissolving 7.43 kg of cesium carbonate ($Cs_2CO_3$) in 6.70 kg of water. The solution was added to 34.57 kg of tungstic acid ($H_2WO_4$) and mixed thoroughly with stirring, then, the mixture was dried with stirring to obtain a dried product (the molar ratio of W and Cs was 1:0.33).

The dried product was heated while feeding 5 vol % $H_2$ gas using $N_2$ gas as a carrier, and fired at a temperature of 800° C. for 5.5 hours. Then, the feed gas was switched to $N_2$ gas only, and the temperature was lowered to room temperature to obtain Cs tungsten oxide particles.

The production conditions are shown in Table 1.

20 parts by mass of Cs tungsten oxide particles, 7 parts by mass of a dispersant having a group containing an amine as a functional group and a polyacrylic main chain (amine value 13 mgKOH/g) (referred to as dispersant a hereafter), and 73 parts by mass of toluene, which is an organic solvent, were weighed. These raw materials were charged into a paint shaker (made by Asada Iron Works Co., Ltd.) containing 0.3 mmφ$ZrO_2$ beads, pulverized and dispersed for 7 hours, to obtain a fine particle dispersion liquid (referred to as fine particle dispersion liquid a hereafter) of fine Cs tungsten oxide fine particles (referred to as fine particle a hereafter). At this time, 300 parts by mass of 0.3 mmφ$ZrO_2$ beads was used for pulverization/dispersion treatment based on 00 parts by mass of the mixture.

The production conditions are shown in Table 1.

Here, the dispersed particle size of the fine particles a in the fine particle dispersion liquid a was measured, and it was found to be 70 nm. Further, a phase was identified by measuring an X-ray diffraction pattern of the fine particles a after removing the solvent from the fine particle dispersion liquid a. As a result, the obtained fine particles were identified as hexagonal $Cs_{0.33}WO_3$ single phase. Further, a lattice constant of the fine particle a was measured, and it was found that a-axis was 7.4076 Å and c-axis was 7.6192 Å, further, a crystallite size was 24 nm. Then, a hexagonal crystal structure was confirmed.

The measurement results are shown in Table 2.

Further to the fine particle dispersion a, 3-aminopropyltrimethoxysilane (CAS No. 13822-56-5, referred to as silane coupling agent a hereafter) which is a metal coupling agent having an amino group, was added and mixed. At this time, silane coupling agent a was added and mixed so that the mass ratio of the silane coupling agent a to the composite tungsten oxide in the resulting dispersion liquid was composite tungsten oxide]/[silane coupling agent a]=100/10. Thereby, a dispersion liquid (referred to as fine particle dispersion liquid a' hereafter) containing the fine particles a, the dispersant, the metal coupling agent having an amino group, and the organic solvent was obtained.

Subsequently, 10 parts by mass of fine particle dispersion a', and 170 parts by mass of an adhesive (manufactured by Soken Chemical Co., Ltd., trade name SK Dyne 1811L, resin solid component 23%) and 0.6 parts by mass of an isocyanate-based crosslinking agent (Soken Chemical Co., Ltd., trade name TD-75, active ingredient 75%) were mixed, to obtain an adhesive composition (referred to as an adhesive composition a hereafter).

Note that the used adhesive contains an acrylic polymer.

On the other hand, ultraviolet curable resin (UV3701 manufactured by Toagosei Co., Ltd.) was applied to one side of a transparent film (Teijin DuPont Films Co., Ltd. 50 μm thick PET film, trade name Tetron (registered trademark) HPE). Subsequently, this coating layer was irradiated with ultraviolet rays having an integrated light amount of 200 mJ/cm$^2$ to be cured to form a hard coat layer. An adhesive layer was prepared by applying the adhesive composition a on the other surface of the transparent film and drying the same, to obtain a near-infrared absorbing film according to Example 1.

The production conditions are shown in Table 2.

For the obtained near-infrared absorbing film according to Example 1, the total light transmittance in the visible light wavelength region was evaluated based on JIS K 7361-1 (1997), and it was found to be 90.2%. Further, the haze value was evaluated based on JIS K 7136 (2000), and it was found to be 0.9%.

The adhesive layer of the obtained near-infrared absorbing film according to Example 1 was attached to a glass plate having a thickness of 3 mm, to obtain a laminated body having a near-infrared absorbing film.

An average particle size of the composite tungsten oxide fine particles dispersed in the adhesive layer according to Example 1 was calculated by an image processing device using a transmission electron microscope image, and it was found to be 25 nm.

For the laminated body according to Example 1, a visible light transmittance, a transmittance at a wavelength of 500 nm, a transmittance at a wavelength of 1000 nm, a transmittance at a wavelength of 1500 nm, and a haze value were obtained.

Then, the visible light transmittance was 70.4%, the transmittance at a wavelength of 500 nm was 72.2%, the transmittance at a wavelength of 1000 nm was 4.7%, the transmittance at a wavelength of 1500 nm was 2.1%, the haze value was 0.9%.

A wet heat test was performed on the laminated body according to Example 1. A difference between a local maximum value and a local minimum value of the transmittance after the test was 71.8%. Accordingly, a change in total light transmittance before and after the test was −0.2%.

In addition, the adhesive composition a left standing for 12 hours after its production was visually evaluated, and it was found that no gelation or cloudiness was observed, and neither aggregation nor precipitation of fine particles a was observed. Then, it was judged that the stability was good.

The measurement results are shown in Table 3.

Example 2

Cs tungsten oxide particles according to Example 2 were obtained in the same manner as in Example 1, except that predetermined amounts of tungstic acid and cesium carbonate were weighed so that the molar ratio of W and Cs was 1:0.31.

A dispersion liquid b of Cs tungsten oxide fine particles (referred to as fine particles b hereafter) according to Example 2 was obtained in the same manner as in Example 1, except that the Cs tungsten oxide particles according to Example 1 were replaced with the Cs tungsten oxide fine particles according to Example 2.

A dispersion liquid containing fine particles b, a dispersant, a metal coupling agent having an amino group, and an organic solvent (referred to as fine particle dispersion liquid b' hereafter) was obtained in the same manner as in Example 1, except that the fine particle dispersion liquid b was used in place of the fine particle dispersion liquid a.

Subsequently, an adhesive composition (referred to as an adhesive composition b hereafter) was obtained in the same manner as in Example 1, except that the fine particle dispersion liquid b' was used in place of the fine particle dispersion liquid a'.

An adhesive layer according to Example 2, a near-infrared absorbing film having the adhesive layer according to Example 2, and a laminated body having the near-infrared absorbing film according to Example 2 were obtained in the same manner as in Example 1, except that an adhesive composition b was used.

The fine particles b, the fine particle dispersion liquid b, the fine particle dispersion liquid b', the adhesive composition b, the near-infrared absorbing film, and the laminated body were evaluated, in the same manner as in Example 1.

The production conditions and evaluation results are shown in Tables 1 to 3.

Example 3

Cs tungsten oxide fine particles according to Example 3 were obtained in the same manner as in Example 1, except that predetermined amounts of tungstic acid and cesium carbonate were weighed so that the molar ratio of W and Cs was 1:0.35.

A dispersion liquid c of Cs tungsten oxide fine particles (referred to as fine particles c hereafter) according to Example 3 was obtained in the same manner as in Example 1, except that the Cs tungsten oxide fine particles according to Example 1 were replaced with the Cs tungsten oxide fine particles according to Example 3.

A dispersion liquid containing composite tungsten oxide fine particles, a dispersant, a metal coupling agent having an amino group, and an organic solvent (referred to as fine particle dispersion liquid c' hereafter) were obtained in the same manner as in Example 1, except that the fine particle dispersion liquid c' was used in place of the fine particle dispersion liquid a'.

Subsequently, an adhesive composition (referred to as an adhesive composition c hereafter) was obtained in the same manner as in Example 1, except that the fine particle dispersion liquid c' was used in place of the fine particle dispersion liquid a'.

An adhesive layer according to Example 3, a near-infrared absorbing film having the adhesive layer according to Example 3, a laminated body having the near-infrared absorbing film according to Example 3, were obtained in the same manner as in Example 1, except that an adhesive composition c was used.

The fine particle dispersion liquid c, the fine particle dispersion liquid c', the adhesive composition c, the near-infrared absorbing film, and the laminated body were evaluated in the same manner as in Example 1.

The production conditions and evaluation results are shown in Tables 1 to 3.

Example 4

Cs tungsten oxide particles according to Example 4 were obtained in the same manner as in Example 1, except that predetermined amounts of tungstic acid and cesium carbonate were weighed so that the molar ratio of W and Cs was 1:0.37.

A dispersion liquid d of Cs tungsten oxide fine particles (referred to as fine particles d hereafter) according to Example 4 was obtained in the same manner as in Example 1, except that the Cs tungsten oxide particles according to Example 1 were replaced with the Cs tungsten oxide fine particles according to Example 4.

Further, a dispersion liquid of fine particles d (referred to as fine particle dispersion liquid d hereafter) was obtained in the same manner as in Example 1, except that fine particles d were used instead of fine particles a.

A dispersion liquid containing fine particles d, a dispersant, a metal coupling agent having an amino group, and an organic solvent (referred to as fine particle dispersion liquid d' hereafter) were obtained in the same manner as in Example 1, except that the fine particle dispersion liquid d was used in place of the fine particle dispersion liquid a.

Subsequently, an adhesive composition (referred to as an adhesive composition d hereafter) was obtained in the same manner as in Example 1, except that fine particle dispersion liquid d' was used in place of the fine particle dispersion liquid a'.

An adhesive layer according to Example 4, a near-infrared absorbing film having the adhesive layer according to Example 4, and a laminated body having the near-infrared absorbing film according to Example 4 were obtained in the same manner as in Example 1, except that an adhesive composition d was used.

The fine particle dispersion liquid d, the fine particle dispersion liquid d', the adhesive composition d, the near-infrared absorbing film, and the laminated body were evaluated in the same manner as in Example 1. The production conditions and evaluation results are shown in Tables 1 to 3.

Example 5

Cs tungsten oxide particles according to Example 5 were obtained in the same manner as in Example 1, except that predetermined amounts of tungstic acid and cesium carbonate were weighed so that the molar ratio of W and Cs was 1:0.21.

A dispersion liquid e of Cs tungsten oxide fine particles (referred to as fine particles e hereafter) according to Example 5 was obtained in the same manner as in Example 1, except that the Cs tungsten oxide particles according to Example 1 were replaced with the Cs tungsten oxide fine particles according to Example 5.

Dispersion liquid containing composite tungsten oxide fine particles, a dispersant, a metal coupling agent having an amino group, and an organic solvent (referred to as fine particle dispersion liquid e' hereafter) were obtained in the same manner as in Example 1, except that the fine particle dispersion liquid e was used in place of the fine particle dispersion liquid a.

Subsequently, an adhesive composition (referred to as an adhesive composition e hereafter) was obtained in the same manner as in Example 1, except that the fine particle dispersion liquid e' was used in place of the fine particle dispersion liquid a'.

An adhesive layer according to Example 5, a near-infrared absorbing film having the adhesive layer according to Example 5, and a laminated body having the near-infrared absorbing film according to Example 5 were obtained in the same manner as in Example 1, except that an adhesive composition e was used.

The fine particle dispersion liquid e, the fine particle dispersion liquid e', the adhesive composition e, the near-infrared absorbing film, and the laminated body were evaluated in the same manner as in Example 1.

The production conditions and evaluation results are shown in Tables 1 to 3.

Example 6

Cs tungsten oxide particles according to Example 6 were obtained in the same manner as in Example 1, except that firing was performed at a temperature of 550° C. for 9.0 hours while feeding 5% $H_2$ gas using $N_2$ gas as a carrier.

A dispersion liquid f of Cs tungsten oxide fine particles (referred to as fine particles f hereafter) according to Example 6 was obtained in the same manner as in Example 1, except that the Cs tungsten oxide particles according to Example 1 were replaced with the Cs tungsten oxide fine particles according to Example 6.

A dispersion liquid containing fine particles f, a dispersant, a metal coupling agent having an amino group, and an organic solvent (referred to as fine particle dispersion liquid f hereafter) were obtained in the same manner as in Example 1, except that the fine particle dispersion liquid f was used in place of the fine particle dispersion liquid a.

Subsequently, an adhesive composition (referred to as an adhesive composition f hereafter) was obtained in the same manner as in Example 1, except that the fine particle dispersion liquid f' was used in place of the fine particle dispersion a'.

An adhesive layer according to Example 6, a near-infrared absorbing film having the adhesive layer according to Example 6, and a laminated body having the near-infrared absorbing film according to Example 6 were obtained in the same manner as in Example 1, except that the adhesive composition f was used.

The fine particle dispersion liquid f, the fine particle dispersion liquid f', the pressure sensitive adhesive composition f, the near-infrared absorbing film, and the laminated body were evaluated, in the same manner as in Example 1.

The production conditions and evaluation results are shown in Tables 1 to 3.

Example 7

A dispersion liquid g of Cs tungsten oxide fine particles (referred to as fine particles g hereafter) according to Example 7 was obtained in the same manner as in Example 1, except that the dispersant having an amine-containing group as a functional group and a polystyrene-based main chain (amine value 66 mgKOH/g) (referred to as dispersant g hereafter) was used in place of the dispersant having a group containing amine as a functional group and a polyacrylic main chain.

Further to the fine particle dispersion liquid g, 3-aminopropyltriethoxysilane which is a metal coupling agent having an amino group (CAS No. 919-30-2, referred to as silane coupling agent g hereafter) was added and mixed. At this time, silane coupling agent g was added and mixed so that the mass ratio of the silane coupling agent g to the composite tungsten oxide in the obtained dispersion liquid was [composite tungsten oxide]/[silane coupling agent g]=100/10. Thereby, a dispersion liquid containing fine particles g, a dispersant, a metal coupling agent having an amino group, and an organic solvent (referred to as fine particle dispersion liquid g' hereafter) was obtained.

Subsequently, an adhesive composition (referred to as an adhesive composition g hereafter) was obtained in the same manner as in Example 1, except that the fine particle dispersion liquid g' was used in place of the fine particle dispersion liquid a'.

An adhesive layer according to Example 7, a near-infrared absorbing film having the adhesive layer according to Example 7, and a laminated body having the near-infrared absorbing film according to Example 11 were obtained in the same manner as in Example 1, except that the adhesive composition g was used.

The fine particle dispersion liquid g, the fine particle dispersion liquid g', the adhesive composition g and its adhesive layer, the near-infrared absorbing film, and the laminated body were evaluated in the same manner as in Example 1.

The production conditions and evaluation results are shown in Tables 1 to 3.

Example 8

A dispersion liquid h of Cs tungsten oxide fine particles (referred to as fine particles h hereafter) according to Example 8 was obtained in the same manner as in Example 1, except that the dispersant having a carboxyl group as a functional group and a polyacrylic main chain (acid value 19 mgKOH/g) (referred to as dispersant h hereafter) was used in place of the dispersant having a group containing amine as a functional group and a polyacrylic main chain.

Further to the fine particle dispersion liquid h, 3-(2-aminoethylamino) propyldimethoxymethylsilane (CAS No. 3069-29-2, referred to as silane coupling agent h hereafter) which is a metal coupling agent having an amino group, was added and mixed. At this time, silane coupling agent h was added and mixed so that the mass ratio of the silane coupling agent h to the composite tungsten oxide in the obtained dispersion liquid was [composite tungsten oxide]/[silane coupling agent h]=100/10. Thereby, a dispersion liquid containing fine particles h, a dispersant, a metal coupling agent having an amino group, and an organic solvent (referred to as fine particle dispersion liquid h' hereafter) was obtained.

Subsequently, an adhesive composition (referred to as adhesive composition h hereafter) was obtained in the same manner as in Example 1, except that the fine particle dispersion liquid h' was used in place of the fine particle dispersion liquid a'.

An adhesive layer according to Example 8, a near-infrared absorbing film having an adhesive layer according to Example 8, and a laminated body having the near-infrared absorbing film according to Example 8, were obtained in the same manner as in Example 1, except that the adhesive composition h was used.

The fine particle dispersion liquid h, the fine particle dispersion liquid h', the adhesive composition h and its adhesive layer, the near-infrared absorbing film, and the laminated body were evaluated in the same manner as in Example 1.

The production conditions and evaluation results are shown in Tables 1 to 3.

Example 9

A dispersion liquid i of Cs tungsten oxide fine particles (referred to as fine particles i hereafter) according to Example 9 was obtained in the same manner as in Example 1, except that the dispersant having a carboxyl group as a functional group and a polyurethane-based main chain (acid value 76 mgKOH/g) (referred to as a dispersant i hereafter) was used in place of the dispersant having a group containing amine as a functional group and a polyacrylic main chain.

Further to the fine particle dispersion i, 3-(2-aminoethylamino) propyltrimethoxysilane (CAS No. 1760-24-3, referred to as silane coupling agent e hereafter) which is a metal coupling agent having an amino group, was added and mixed. At this time, silane coupling agent i was added and mixed so that the mass ratio of the silane coupling agent e to the composite tungsten oxide in the obtained dispersion liquid was [composite tungsten oxide]/[silane coupling agent i]=100/10. Thereby, a dispersion liquid (referred to as fine particle dispersion liquid i' hereafter) containing the fine particles i, the dispersant, the metal coupling agent having an amino group, and the organic solvent, was obtained.

Subsequently, an adhesive composition (referred to as an adhesive composition i hereafter) was obtained in the same manner as in Example 1, except that the fine particle dispersion liquid i' was used in place of the fine particle dispersion liquid a'.

An adhesive layer according to Example 9, a near-infrared absorbing film having an adhesive layer according to Example 9, and a laminated body having the near-infrared absorbing film according to example 9, were obtained in the same manner as in Example 1, except that the adhesive composition i was used.

The fine particle dispersion liquid i, the fine particle dispersion liquid i', the adhesive composition i and its adhesive layer, the near-infrared absorbing film, and the laminated body were evaluated in the same manner as in Example 1.

The production conditions and evaluation results are shown in Tables 1 to 3.

Example 10

A dispersion liquid j of Cs tungsten oxide fine particles (referred to as fine particles j hereafter) according to Example 10 was obtained in the same manner as in Example 1, except that the dispersant having a carboxyl group as a functional group and a polystyrene-based main chain (acid value 29 mgKOH/g) (referred to as dispersant j hereafter) was used in place of the dispersant having a group containing amine as a functional group and a polyacrylic main chain.

Further to the fine particle dispersion liquid j, trimethoxy [3-(phenylamino) propyl] silane (CAS No. 3068-76-6, hereinafter referred to as a silane coupling agent j) which is a metal coupling agent having an amino group, was added and mixed. At this time, the silane coupling agent j was added and mixed so that the mass ratio of the silane coupling agent j to the composite tungsten oxide in the obtained dispersion liquid was [composite tungsten oxide]/[silane coupling agent f]=100/10. Thereby, a dispersion liquid (referred to as fine particle dispersion liquid j' hereafter) containing the fine particles j, the dispersant, the metal coupling agent having an amino group, and the organic solvent, was obtained.

Subsequently, an adhesive composition (referred to as an adhesive composition j hereafter) was obtained in the same manner as in Example 1, except that the fine particle dispersion liquid j' was used in place of the fine particle dispersion liquid a'.

The fine particle dispersion liquid j, the fine particle dispersion liquid j', the adhesive composition j and its adhesive layer, the near-infrared absorbing film, and the laminated body were evaluated in the same manner as in Example 1.

The manufacturing conditions and evaluation results are shown in Tables 1 to 3.

Example 11

A dispersion liquid k of Cs tungsten oxide fine particles (referred to as fine particles k hereafter) according to Example 11 was obtained in the same manner as in Example 1, except that the dispersant having a group containing a carboxyl group as a functional group and an aliphatic main chain (amine value 42 mgKOH/g, acid value 25 mgKOH/g) (referred to as a dispersant k hereafter) was used in place of the dispersant having a group containing amine as a functional group and a polyacrylic main chain.

A dispersion liquid containing composite tungsten oxide fine particles, a dispersant, a metal coupling agent having an amino group, and an organic solvent (referred to as a fine particle dispersion liquid k' hereafter) were obtained in the same manner as in Example 1, except that the fine particle dispersion liquid k was used in place of the fine particle dispersion liquid a.

Subsequently, an adhesive composition (referred to as an adhesive composition k hereafter) was obtained in the same manner as in Example 1, except that the fine particle dispersion liquid k' was used in place of the fine particle dispersion liquid a'.

An adhesive layer according to Example 11, a near-infrared absorbing film having an adhesive layer according to Example 11, and a Laminated body having the near-infrared absorbing film according to Example 11, were obtained in the same manner as in Example 1, except that the adhesive composition k was used.

The fine particle dispersion liquid k, the fine particle dispersion liquid k', the adhesive composition k and its adhesive layer, the near-infrared absorbing film, and the laminated body were evaluated in the same manner as in Example 1.

The production conditions and evaluation results are shown in Tables 1 to 3.

Example 12

20 parts by mass of fine particle a, 7 parts by mass of the dispersing agent a, 73 parts by mass of toluene which is an organic solvent, 1 part by mass of benzotriazole-based ultraviolet absorbing agent including a benzotriazole compound (produced by BASF, TINUVIN384-2), 1 part by mass of an aminoether-based HALS including a reaction product of decanedioicacid bis(2,2,6,6-tetramethyl-1-(octyloxy)-4-piperidinyl)ester, 1,1-dimethylethylhydroperoxide and octane (produced by BASF, TINUVIN123), and 1 part by mass of a hindered phenol-based antioxidant including isooctyl-3-(3,5-di-t-butyl-4-hydroxyphenyl) propionate (produced by BASF, product name IRGANOX1135) as an antioxidant were weighed. These raw materials were pulverized and dispersed in the same manner as in Example 1 to obtain a dispersion liquid l of Cs tungsten oxide fine particles (referred to as fine particles l hereafter) according to Example 12.

By adding an ultraviolet absorber. HALS, and an antioxidant, the weather resistance of the adhesive layer is improved.

A dispersion liquid (referred to as fine particle dispersion liquid l' hereafter) containing fine particles l, a dispersant, an amino group-containing metal coupling agent, an organic solvent, an ultraviolet absorber. HALS, and an antioxidant were obtained in the same manner as in Example 1, except that the fine particle dispersion liquid l was used in place of the fine particle dispersion a.

Subsequently, an adhesive composition (referred to as an adhesive composition 1 hereafter) was obtained in the same manner as in Example 1, except that the fine particle dispersion liquid l' was used in place of the fine particle dispersion a'.

An adhesive layer according to Example 12, a near-infrared absorbing film having the adhesive layer according to Example 12, and a laminated body having the near-infrared absorbing film according to example 12, were obtained in the same manner as in Example 1, except that an adhesive composition 1 was used.

The fine particle dispersion liquid l, the fine particle dispersion liquid l', the adhesive composition 1 and its adhesive layer, the near-infrared absorbing film, and the laminated body were evaluated in the same manner as in Example 1.

The production conditions and evaluation results are shown in Tables 1 to 3.

Comparative Example 1

Cs tungsten oxide particles according to Comparative Example 1 were obtained in the same manner as in Example 1, except that predetermined amounts of tungstic acid and cesium carbonate were weighed so that the molar ratio of W and Cs was 1:0.15.

A dispersion liquid m of Cs tungsten oxide fine particles (referred to as fine particles m hereafter) according to Comparative Example 1 was obtained in the same manner as in Example 1, except that the Cs tungsten oxide particles according to Example 1 were replaced with the Cs tungsten oxide fine particles according to Comparative Example 1.

Further, a dispersion liquid of fine particles m (referred to as a fine particle dispersion liquid m hereafter) was obtained in the same manner as in Example 1, except that the fine particles m were used in place of the fine particles a.

A dispersion liquid (referred to as fine particle dispersion liquid m' hereafter) containing fine particles m, a dispersant, a metal coupling agent having an amino group, and an organic solvent, was obtained in the same manner as in Example 1, except that the fine particle dispersion liquid m was used in place of the fine particle dispersion liquid m.

Subsequently, an adhesive composition (referred to as an adhesive composition m hereafter) was obtained in the same manner as in Example 1, except that the fine particle dispersion liquid m' was used in place of the fine particle dispersion a'.

An adhesive layer according to Comparative Example 1, a near-infrared absorbing film having the adhesive layer according to Comparative Example 1, and a laminated body having the near-infrared absorbing film according to Comparative Example 1, were obtained in the same manner as in Example 1, except that the adhesive composition m was used.

The fine particle dispersion liquid m, the fine particle dispersion liquid m', the adhesive composition m and its adhesive layer, the near-infrared absorbing film, and the laminated body were evaluated in the same manner as in Example 1.

The production conditions and evaluation results are shown in Tables 4 to 6.

Comparative Example 2

Cs tungsten oxide particles according to Comparative Example 2 were obtained in the same manner as in Example 1, except that predetermined amounts of tungstic acid and cesium carbonate were weighed so that the molar ratio of W and Cs was 1:0.39.

A dispersion liquid n of Cs tungsten oxide fine particles (referred to as fine particles n hereafter) according to Comparative Example 2 was obtained in the same manner as in Example 1, except that the Cs tungsten oxide particles according to Example 1 were replaced with the Cs tungsten oxide particles according to Comparative Example 2.

A dispersion liquid containing fine particles n, a dispersant, a metal coupling agent having an amino group, and an organic solvent (referred to as fine particle dispersion liquid n' hereafter) were obtained in the same manner as in Example 1, except that the fine particle dispersion liquid n was used in place of the fine particle dispersion liquid a.

Subsequently, an adhesive composition (referred to as an adhesive composition n hereafter) was obtained in the same manner as in Example 1, except that the fine particle dispersion liquid n' was used in place of the fine particle dispersion liquid a'.

An adhesive layer according to Comparative Example 2, a near-infrared absorbing film having the adhesive layer according to Comparative Example 2, and a laminated body having the near-infrared absorbing film according to Comparative Example 2, were obtained in the same manner as in Example 1, except that an adhesive composition n was used.

The fine particle dispersion liquid n, the fine particle dispersion liquid n', the adhesive composition n and its adhesive layer, the near-infrared absorbing film, and the laminated body were evaluated in the same manner as in Example 1.

The production conditions and evaluation results are shown in Tables 4 to 6.

Comparative Example 3

Fine particles of Cs tungsten oxide according to Comparative Example 3 (referred to as fine particles o hereafter) were obtained in the same manner as in Example 1, except that predetermined amounts of tungstic acid and cesium carbonate were weighed so that the molar ratio of W and Cs was 1:0.23, and fired at a temperature of 400° C. for 5.5 hours.

A dispersion liquid of fine particles o (referred to as a fine particle dispersion liquid o hereafter) was obtained in the same manner as in Example 1, except that the Cs tungsten oxide fine particles according to Example 1 were replaced with fine particles o.

A dispersion liquid containing composite tungsten oxide fine particles, a dispersant, a metal coupling agent having an amino group, and an organic solvent (referred to as fine particle dispersion liquid o' hereafter), were obtained in the same manner as in Example 1, except that the fine particle dispersion liquid o was used in place of the fine particle dispersion liquid a.

Subsequently, an adhesive composition (referred to as an adhesive composition o hereafter) was obtained in the same manner as in Example 1, except that the fine particle dispersion liquid o' was used in place of the fine particle dispersion liquid a'.

An adhesive layer according to Comparative Example 3, a near-infrared absorbing film having the adhesive layer according to Comparative Example 3, and a laminated body having the near-infrared absorbing film according to Comparative Example 3, were obtained in the same manner as in Example 1, except that an adhesive composition o was used.

The fine particle dispersion liquid o, the fine particle dispersion liquid o', the adhesive composition o and its adhesive layer, the near-infrared absorbing film, and the laminated body were evaluated in the same manner as in Example 1.

The production conditions and evaluation results are shown in Tables 4 to 6.

Comparative Example 4

20 parts by mass of the fine particles a, 7 parts by mass of the dispersant a, and 73 parts by mass of toluene as an organic solvent were weighed and mixed by ultrasonic vibration for 10 minutes, to obtain a dispersion liquid of fine particles of Cs tungsten oxide according to Comparative Example 4 (referred to as a fine particle dispersion liquid p hereafter).

A dispersion liquid containing fine particles p, a dispersant, a metal coupling agent having an amino group, and an organic solvent (referred to as a fine particle dispersion liquid p' hereafter) were obtained in the same manner as in Example 1, except that the fine particle dispersion liquid p was used in place of the fine particle dispersion liquid a.

Subsequently, an adhesive composition (referred to as an adhesive composition p hereafter) was obtained in the same manner as in Example 1, except that the fine particle dispersion liquid p' was used in place of the fine particle dispersion a'.

An adhesive layer according to Comparative Example 4, a near-infrared absorbing film having the adhesive layer according to Comparative Example 4, and a laminated body having the near-infrared absorbing film according to Comparative Example 4, were obtained in the same manner as in Example 1, except that an adhesive composition p was used.

The fine particle dispersion liquid p, the fine particle dispersion liquid p', the adhesive composition p and its adhesive layer, the near-infrared absorbing film, and the laminated body, were evaluated in the same manner as in Example 1.

The production conditions and evaluation results are shown in Tables 4 to 6.

Comparative Example 5

10 parts by mass of fine particle dispersion liquid a, 170 parts by mass of an adhesive (manufactured by Soken Chemical Co., Ltd., trade name SK Dyne 1811L, resin solid component 23%), and 0.6 parts by mass of a crosslinking agent (manufactured by Soken Chemical Co., Ltd., trade name TD-75, active ingredient 75%), were mixed, to obtain an adhesive composition (referred to as an adhesive composition q hereafter).

Note that the fine particle dispersion liquid a does not contain a metal coupling agent having an amino group.

An adhesive layer according to Comparative Example 5, a near-infrared absorbing film having the adhesive layer according to Comparative Example 5, and a laminated body having the near-infrared absorbing film according to Comparative Example 5, were obtained in the same manner as in Example 1, except that the adhesive composition q was used in place of the adhesive composition a.

An adhesive layer according to Comparative Example 5, a near-infrared absorbing film having the adhesive layer according to Comparative Example 5, and a laminated body having the near-infrared absorbing film according to Comparative Example 5, were obtained in the same manner as in Example 1, except that an adhesive composition q was used.

The fine particle dispersion liquid q, the fine particle dispersion liquid q', the adhesive composition q and its adhesive layer, the near-infrared absorbing film, and the laminated body were evaluated in the same manner as in Example 1.

The production conditions and evaluation results are shown in Tables 4 to 6.

Comparative Example 6

100 parts by mass of the fine particle dispersion liquid a and 100 parts by mass of an ultraviolet curable resin (UV3701 manufactured by Toagosei Co., Ltd.) were mixed, to prepare a hard coat liquid (referred to as a hard coat liquid r hereafter). The hard coat liquid r was applied to one surface of the same transparent film as that used in preparing the near-infrared absorbing film in Example 1 and dried, which was then irradiated with ultraviolet rays having an integrated light amount of 200 mJ/cm$^2$ and cured, to form a hard coat layer according to Comparative Example 6 (referred to as a hard coat layer R hereafter).

Note that the fine particle dispersion liquid a does not contain a metal coupling agent having an amino group.

Subsequently, 170 parts by mass of an adhesive (manufactured by Soken Chemical Co., Ltd., trade name SK Dyne 1811L, resin solid component 23%), and 0.6 parts by mass of a crosslinking agent (manufactured by Soken Chemical Co., Ltd., trade name TD-75, active ingredient 75%), were mixed, to obtain an adhesive composition (referred to as an adhesive composition r hereafter).

The adhesive composition r is applied to the surface of the transparent film on which the hard coat layer R is not arranged, which is then dried, to prepare an adhesive layer (referred to as adhesive layer R hereafter). The adhesive layer R of a near-infrared absorbing film (referred to as a near-infrared absorbing film R hereafter) having a hard coat layer R and an adhesive layer R were attached to a 3 mm thick glass plate, to obtain a laminated body having the near-infrared absorbing film (referred to as laminated body R hereafter).

The hard coat liquid r, the hard coat layer R, the near-infrared absorbing film R, and the laminated body R, were evaluated in the same manner as in Example 1.

The production conditions and evaluation results are shown in Tables 4 to 6.

Comparative Example 7

Further to the fine particle dispersion a, alkoxysilane n-propyltrimethoxysilane as a metal coupling agent (CAS No. 1067-25-0, referred to as silane coupling agent s hereafter) was added and mixed.

Note that the silane coupling agent s has no amino group.

At this time, the silane coupling agent s was added and mixed so that the mass ratio of the silane coupling agent s to the composite tungsten oxide in the obtained dispersion liquid was [composite tungsten oxide]/[silane coupling agent r]=100/10. Thereby, a dispersion liquid containing fine particles, a dispersant a, a metal coupling agent, and an organic solvent (referred to as a fine particle dispersion liquid s' hereafter), were obtained.

Subsequently, an adhesive composition (referred to as an adhesive composition s hereafter) was obtained in the same manner as in Example 1, except that the fine particle dispersion liquid s' was used in place of the fine particle dispersion liquid a'.

An adhesive layer according to Comparative Example 7, a near-infrared absorbing film having the adhesive layer according to Comparative Example 7, and a laminated body having the near-infrared absorbing film according to Comparative Example 7, were obtained in the same manner as in Example 1, except that the adhesive composition s was used in place of the adhesive composition a.

The fine particle dispersion liquid s', the adhesive composition s and its adhesive layer, the near-infrared absorbing film, and the laminated body were evaluated in the same manner as in Example 1.

The production conditions and evaluation results are shown in Tables 4 to 6.

Comparative Example 8

Further to the fine particle dispersion liquid a, vinyltrimethoxysilane (CAS No. 2768-02-7, referred to as a silane coupling agent t hereafter) which is a metal coupling agent, was added and mixed.

Note that the silane coupling agent t has no amino group.

At this time, the silane coupling agent t was added and mixed so that the mass ratio of the silane coupling agent t to the composite tungsten oxide in the obtained dispersion liquid was [composite tungsten oxide]/[silane coupling agent s]=100/10. Thereby, a dispersion liquid containing fine particles a, a dispersant, a metal coupling agent, and an organic solvent (referred to as a fine particle dispersion liquid t' hereafter), was obtained.

Subsequently, an adhesive composition (referred to as an adhesive composition t hereafter) was obtained in the same manner as in Example 1, except that the fine particle dispersion liquid t' was used in place of the fine particle dispersion liquid a'.

An adhesive layer according to Comparative Example 8, an adhesive layer according to Comparative Example 8, a near-infrared absorbing film having the adhesive layer according to Comparative Example 8, and a laminated body having the near-infrared absorbing film according to Comparative Example 8, were obtained in the same manner as in Example 1, except that the adhesive composition t was used in place of the adhesive composition a.

The fine particle dispersion liquid t', the adhesive composition t and its adhesive layer, the near-infrared absorbing film, and the laminated body, were evaluated in the same manner as in Example 1.

The production conditions and evaluation results are shown in Tables 4 to 6.

Comparative Example 9

Cs tungsten oxide fine particles (referred to as fine particles u hereafter) according to Comparative Example 9 were obtained in the same manner as in Example 1, except that the time for the pulverization/dispersion treatment with a paint shaker was changed from 7 hours to 50 hours. A dispersion liquid (referred to as a fine particle dispersion liquid u hereafter) containing the fine particles u, a dispersant, a metal coupling agent, and an organic solvent were obtained.

A dispersion liquid containing fine particles u, a dispersant, a metal coupling agent having an amino group, and an organic solvent (referred to as a fine particle dispersion liquid u' hereafter), were obtained in the same manner as in Example 1, except that the fine particle dispersion liquid u was used in place of the fine particle dispersion liquid a.

Subsequently, an adhesive composition (referred to as an adhesive composition u hereafter) was obtained in the same manner as in Example 1, except that the fine particle dispersion liquid u' was used in place of the fine particle dispersion liquid a'.

An adhesive layer according to Comparative Example 9, a near-infrared absorbing film having the adhesive layer according to Comparative Example 9, and a laminated body having the near-infrared absorbing film according to Comparative Example 9, were obtained in the same manner as in Example 1, except that the adhesive composition u was used.

The fine particle dispersion liquid u, the fine particle dispersion liquid u', the adhesive composition u and its adhesive layer, the near-infrared absorbing film, and the laminated body were evaluated in the same manner as in Example 1.

The production conditions and evaluation results are shown in Tables 4 to 6.

CONCLUSION

According to the results of Examples 1 to 12 and Comparative Examples 1 to 9 described above, it was confirmed that all of the laminates having the adhesive layer according to Examples 1 to 12 have a low haze value and efficiently absorb the light in the near-infrared region, and at the same time, retain a high transmittance in the visible light region and have a small change in the total light transmittance before and after the wet heat test and have excellent weather resistance. In addition, the stability of the adhesive composition was also good.

In contrast, the laminated bodies having the adhesive layers according to Comparative Examples 1 to 4 all have low near-infrared absorption properties, and the transmittance at the wavelength of 1000 nm was 17% or more, and the transmittance at the wavelength of 1500 nm was 9% or more.

Further, the laminated bodies having the adhesive layers according to Comparative Examples 5, 7, and 8 all have high haze values, and were not suitable as a near-infrared absorbing film to be used by being attached to a window material. In addition, in the adhesive composition left standing for 12 hours after production, gelation, cloudiness, aggregation and precipitation of the composite tungsten oxide fine particles were confirmed, and the stability of the adhesive composition was poor.

Further, the laminated body having a hard coat layer according to Comparative Example 6 had a large change in the total light transmittance before and after the wet heat test, and the weather resistance was not sufficient.

Further, the laminated body having an adhesive layer according to Comparative Example 9 had a high haze value, and the transmittance at the wavelength of 1000 nm was about 26%, and the transmittance at the wavelength of 1500 nm was about 15%, and desired near-infrared absorption properties could not be exhibited.

TABLE 1

| | synthesis of composite tungsten oxide | | | | | | composite tungsten oxide fine particle dispersion liquid | |
|---|---|---|---|---|---|---|---|---|
| | | ratio | | firing condition | | | MWO | |
| | raw material | Cs/W | Rb/W | $H_2$ concentration [%] | temperature [° C.] | time [h] | kind | |
| Example 1 | $Ca_2CO_3$&$H_2WO_4$ | 0.33 | — | 5 | 800 | 5.5 | a | |
| Example 2 | $Ca_2CO_3$&$H_2WO_4$ | 0.31 | — | 5 | 800 | 5.5 | b | |
| Example 3 | $Ca_2CO_3$&$H_2WO_4$ | 0.35 | — | 5 | 800 | 5.5 | c | |
| Example 4 | $Ca_2CO_3$&$H_2WO_4$ | 0.37 | — | 5 | 800 | 5.5 | d | |
| Example 5 | $Ca_2CO_3$&$H_2WO_4$ | 0.21 | — | 5 | 800 | 5.5 | e | |
| Example 6 | $Ca_2CO_3$&$H_2WO_4$ | 0.33 | — | 5 | 550 | 9.0 | a | |
| Example 7 | $Ca_2CO_3$&$H_2WO_4$ | 0.33 | — | 5 | 800 | 5.5 | a | |
| Example 8 | $Ca_2CO_3$&$H_2WO_4$ | 0.33 | — | 5 | 800 | 5.5 | a | |

TABLE 1-continued

| | | | | | | | |
|---|---|---|---|---|---|---|---|
| Example 9 | $Ca_2CO_3$&$H_2WO_4$ | 0.33 | — | 5 | 800 | 5.5 | a |
| Example 10 | $Ca_2CO_3$&$H_2WO_4$ | 0.33 | — | 5 | 800 | 5.5 | a |
| Example 11 | $Ca_2CO_3$&$H_2WO_4$ | 0.33 | — | 5 | 800 | 5.5 | a |
| Example 12 | $Ca_2CO_3$&$H_2WO_4$ | 0.33 | — | 5 | 800 | 5.5 | a |

| | composite tungsten oxide fine particle dispersion liquid | | | | | | |
|---|---|---|---|---|---|---|---|
| | MWO | dispersant | | organic solvent | pulverization condition | | MWO particle |
| | part by mass | kind | part by mass | toluene part by mass | beads① [mm] | pulverising device | time [hr] | size* [nm] |
| Example 1 | 20 | polyacrylic main chain amin group | 7 | 73 | 0.3 | paint shaker | 7 | 70 |
| Example 2 | 20 | | 7 | 73 | 0.3 | | 7 | 70 |
| Example 3 | 20 | | 7 | 73 | 0.3 | | 7 | 70 |
| Example 4 | 20 | | 7 | 73 | 0.3 | | 7 | 70 |
| Example 5 | 20 | | 7 | 73 | 03 | | 7 | 70 |
| Example 6 | 20 | | 7 | 73 | 0.3 | | 7 | 70 |
| Example 7 | 20 | styrene-based main chain amine group | 7 | 73 | 0.3 | | 7 | 70 |
| Example 8 | 20 | polyacrylic main chain carboxyl group | 7 | 73 | 0.3 | | 7 | 80 |
| Example 9 | 20 | polyurethane-based main chain carboxyl group | 7 | 73 | 0.3 | | 7 | 80 |
| Example 10 | 20 | polystyrene-based main chain carboxyl group | 7 | 73 | 0.3 | | 7 | 70 |
| Example 11 | 20 | aliphatic main chain carboxyl group | 7 | 73 | 0.3 | | 7 | 80 |
| Example 12 | 20 | polyacrylic main chain amine group (antioxidant) (TINUVIN384-2 1) (TINUVIN123 1) (IRGANOX1135 1) | 7 | 73 | 0.3 | | 7 | 80 |

MWO particle size*: dispersed particle size of composite tungsten oxide fine particle in composite tungsten oxide fine particle dispersion liquid

TABLE 2

| | composite tungsten oxide fine particles | | | composite tungsten oxide fine particle dispersion liquid | | |
|---|---|---|---|---|---|---|
| | crystallite | | | | metal coupling agent | |
| | a-axis [Å] | c-axis [Å] | size [nm] | MWO kind | kind | [MWO]/ [coupling agent] |
| Example 1 | 7.4076 | 7.6182 | 24 | a | 3-aminopropyltrimethoxysilane | 100/10 |
| Example 2 | 7.4118 | 7.6156 | 24 | b | | 100/10 |
| Example 3 | 7.4055 | 7.6193 | 24 | c | | 100/10 |
| Example 4 | 7.4073 | 7.6211 | 24 | d | | 100/10 |
| Example 5 | 7.4173 | 7.5812 | 24 | e | | 100/10 |
| Example 6 | 7.4073 | 7.6197 | 24 | f | | 100/10 |
| Example 7 | 7.4079 | 7.6203 | 24 | g | 3-aminopropyltriethoxy silane | 100/10 |
| Example 8 | 7.4073 | 7.6179 | 24 | h | 3-(2-aminoethylamino) propyldimethoxymethylsilane | 100/10 |
| Example 9 | 7.4084 | 7.6210 | 24 | i | 3-(2-aminoethylamino) propyltrimethoxysilane | 100/10 |
| Example 10 | 7.4083 | 7.6199 | 24 | j | trimethoxy [3-(phenylamino) propyl] silane | 100/10 |
| Example 11 | 7.4071 | 7.6195 | 24 | k | 3-aminopropyltrimethoxysilane | 100/10 |
| Example 12 | 7.4084 | 7.6200 | 24 | l | | 100/10 |

TABLE 2-continued

|  | adhesive composition | | | | | |
|---|---|---|---|---|---|---|
|  | dispersion liquid | | adhesive | | crosslinking agent | |
|  | kind | part by mass | kind | part by mass | kind | part by mass |
| Example 1 | a' | 10 | SK Dyne 1811 | 170 | isocyanate-based TD-75 | 0.6 |
| Example 2 | b' | 10 |  | 170 |  | 0.6 |
| Example 3 | c' | 10 |  | 170 |  | 0.6 |
| Example 4 | d' | 10 |  | 170 |  | 0.6 |
| Example 5 | e' | 10 |  | 170 |  | 0.6 |
| Example 6 | f' | 10 |  | 170 |  | 0.6 |
| Example 7 | g' | 10 |  | 170 |  | 0.6 |
| Example 8 | h' | 10 |  | 170 |  | 0.6 |
| Example 9 | i' | 10 |  | 170 |  | 0.6 |
| Example 10 | j' | 10 |  | 170 |  | 0.6 |
| Example 11 | k' | 10 |  | 170 |  | 0.6 |
| Example 12 | l' | 10 |  | 170 |  | 0.6 |

TABLE 3

|  | transmittance | | | | haze value [%] | stability | MWO average particle size** [nm] |
|---|---|---|---|---|---|---|---|
|  | visible light [%] | 500 nm [%] | 1000 nm [%] | 1500 nm [%] |  |  |  |
| Example 1 | 70.4 | 72.2 | 4.7 | 2.1 | 0.9 | ○ | 25 |
| Example 2 | 69.8 | 73.1 | 4.6 | 2 | 0.8 | ○ | 25 |
| Example 3 | 69.8 | 73.1 | 4.9 | 2.3 | 0.8 | ○ | 24 |
| Example 4 | 69.3 | 73.1 | 4.3 | 2.2 | 0.8 | ○ | 25 |
| Example 5 | 69.4 | 72.1 | 7.1 | 5 | 0.9 | ○ | 24 |
| Example 6 | 69.9 | 72.9 | 4.7 | 2 | 0.7 | ○ | 25 |
| Example 7 | 69.4 | 72.5 | 4.6 | 1.9 | 0.7 | ○ | 25 |
| Example 8 | 70.3 | 72.6 | 4.6 | 2 | 0.7 | ○ | 25 |
| Example 9 | 71 | 73.5 | 4.8 | 2.1 | 0.9 | ○ | 25 |
| Example 10 | 70.6 | 72.8 | 4.7 | 2 | 0.8 | ○ | 25 |
| Example 11 | 70.1 | 71.7 | 4.4 | 1.7 | 0.9 | ○ | 25 |
| Example 12 | 71.2 | 73.1 | 4.7 | 2.1 | 0.7 | ○ | 25 |

MWO average particle size**: average particle size of composite tungsten oxide fine particles dispersed in adhesive layer

TABLE 4

|  | synthesis at composite tungsten oxide | | | | | | composite tungsten oxide fine particle dispersion liquid |
|---|---|---|---|---|---|---|---|
|  |  | ratio | | firing condition | | | |
|  | raw material | Cs/W | Rb/W | $H_2$ concentration [%] | temperature [° C.] | time [h] | MWO kind |
| comparative Example 1 | $Ca_2CO_2$&$H_2WO_4$ | 0.15 | — | 5 | 800 | 5.5 | l |
| comparative Example 2 |  | 0.39 | — | 5 | 800 | 5.5 | m |
| comparative Example 3 |  | 0.23 | — | 5 | 400 | 5.5 | n |
| comparative Example 4 |  | 0.33 | — | 5 | 800 | 5.5 | a |
| comparative Example 5 |  | 0.33 | — | 5 | 800 | 5.5 | a |
| comparative Example 6 |  | 0.33 | — | 5 | 800 | 5.5 | a |
| comparative Example 7 |  | 0.33 | — | 5 | 800 | 5.5 | a |
| comparative Example 8 |  | 0.33 | — | 5 | 800 | 5.5 | a |
| comparative Example 9 |  | 0.33 | — | 5 | 800 | 5.5 | a |

TABLE 4-continued

| | composite tungsten oxide fine particle dispersion liquid | | | | | | | |
|---|---|---|---|---|---|---|---|---|
| | MWO | dispersant | | organic solvent toluene | pulverization condition | | | MWO particle |
| | part by mass | kind | part by mass | part by mass | beads① [mm] | pulverizing device | time [hr] | size* [nm] |
| comparative Example 1 | 20 | polyacrylic main chain amine group | 7 | 78 | 0.3 | paint shaker | 7 | 70 |
| comparative Example 2 | 20 | | 7 | 73 | 0.3 | | 7 | 70 |
| comparative Example 3 | 20 | | 7 | 73 | 0.3 | | 7 | 70 |
| comparative Example 4 | 20 | | 7 | 73 | — | ultrasonic wave | 10 min | 70 |
| comparative Example 5 | 20 | | 7 | 73 | 0.3 | paint shaker | 7 | 70 |
| comparative Example 6 | 20 | | 7 | 73 | 0.3 | | 7 | 70 |
| comparative Example 7 | 20 | | 7 | 73 | 0.3 | | 7 | 70 |
| comparative Example 8 | 20 | | 7 | 73 | 0.3 | | 7 | 70 |
| comparative Example 9 | 20 | | 7 | 73 | 0.3 | | 50 | 110 |

MWO*: dispersed particle size of composite tungsten oxide fine particles in composite tungsten oxide fine particle dispersion liquid

TABLE 5

| | composite tungsten oxide fine particles | | | composite tungsten oxide fine particle dispersion liquid | | |
|---|---|---|---|---|---|---|
| | crystallite | | | | metal coupling agent | |
| | a-axis [Å] | c-axis [Å] | size [nm] | MWO Kind | Kind | [MWO]/[coupling agent] |
| comparative Example 1 | 7.4192 | 7.5830 | 24 | m | 3-aminopropyltrimethoxysilane | 100/10 |
| comparative Example 2 | 7.4030 | 7.6255 | 24 | n | | 100/10 |
| comparative Example 3 | 7.4213 | 7.5750 | 24 | o | | 100/10 |
| comparative Example 4 | 7.4251 | 7.6310 | 125 | p | | 100/10 |
| comparative Example 5 | 7.4076 | 7.6192 | 24 | a | — | — |
| comparative Example 6 | 7.4006 | 7.6120 | 24 | a | — | — |
| comparative Example 7 | 7.4076 | 7.6192 | 24 | a | n-propyltrimethoxysilane | 100/10 |
| comparative Example 8 | 7.4076 | 7.6192 | 24 | a | vinyltrimethoxysilane | 100/10 |
| comparative Example 9 | 7.4095 | 7.6336 | 9 | u | 3-aminopropyltrimethoxysilane | 100/10 |

| | adhesive composition | | | | | |
|---|---|---|---|---|---|---|
| | dispersion liquid | | adhesive | | Crosslinking agent | |
| | Kind | part by mass | Kind | part by mass | Kind | part by mass |
| comparative Example 1 | m' | 10 | SK Dyne 1811 | 170 | isocyanate-based TD-75 | 0.6 |
| comparative Example 2 | n' | 10 | | 170 | | 0.6 |
| comparative Example 3 | o' | 10 | | 170 | | 0.6 |
| comparative Example 4 | p' | 10 | | 170 | | 0.5 |
| comparative Example 5 | q' | 10 | | 170 | | 0.6 |
| comparative Example 6 | — | 100 | ultraviolet curable resin | 100 | — | — |
| comparative Example 7 | s' | 10 | SK Dyne 1811 | 170 | isocyanate-based TD-75 | 0.6 |
| comparative Example 8 | t' | 10 | | 170 | | 0.6 |
| comparative Example 9 | u' | 10 | | 170 | | 0.6 |

TABLE 6

| | transmittance | | | | haze value [%] | stability | MWO average particle size** [nm] |
|---|---|---|---|---|---|---|---|
| | visible light [%] | 500 nm [%] | 1000 nm [%] | 1500 nm [%] | | | |
| Comparative Example 1 | 70.0 | 72.5 | 17.4 | 11.1 | 0.9 | ○ | 25 |
| Comparative Example 2 | 70.5 | 71.6 | 19.6 | 9.7 | 0.8 | ○ | 25 |

TABLE 6-continued

|  | transmittance | | | | haze value [%] | stability | MWO average particle size** [nm] |
|---|---|---|---|---|---|---|---|
|  | visible light [%] | 500 nm [%] | 1000 nm [%] | 1500 nm [%] | | | |
| Comparative Example 3 | 71.0 | 72.8 | 25.6 | 15.4 | 0.8 | ○ | 25 |
| Comparative Example 4 | 70.1 | 73.0 | 53.1 | 45.4 | 10.5 | ○ | 120 |
| Comparative Example 5 | 69.3 | 70.8 | 19.6 | 9.7 | 9.4 | X | 25 |
| Comparative Example 6 | 71.6 | 72.6 | 20.4 | 10.3 | 0.8 | — | 25 |
| Comparative Example 7 | 69.3 | 71.4 | 19.8 | 10.0 | 8.3 | X | 25 |
| Comparative Example 8 | 70.6 | 71.5 | 19.5 | 9.4 | 3.5 | X | 25 |
| Comparative Example 9 | 69.5 | 72.6 | 26.0 | 14.9 | 3.7 | ○ | 41 |

MWO average particle size**: average particle size of composite tungsten oxide fine particles dispersed in adhesive layer

DESCRIPTION OF SIGNS AND NUMERALS

1 Thermal plasma
2 High-frequency coil
3 Sheath gas feed nozzle
4 Plasma gas feed nozzle
5 Raw material powder feed nozzle
6 Reaction vessel
7 Absorption tube
8 Filter

The invention claimed is:

1. An adhesive layer containing composite tungsten oxide fine particles, a dispersant, a metal coupling agent having an amino group, an adhesive, and a crosslinking agent, wherein
the composite tungsten oxide fine particles having lattice constant values of 7.3850 Å or more and 7.4186 Å or less on a-axis, and 7.5600 Å or more and 7.6240 Å or less on c-axis,
the composite tungsten oxide fine particles having an average particle size of 100 nm or less, and
the lattice constant values and the average particle size are values after pulverizing the composite tungsten oxide fine particles.

2. The adhesive layer according to claim 1, wherein the lattice constant values of the composite tungsten oxide fine particles is 7.4031 Å or more and 7.4111 Å or less on the a-axis, and 7.5891 Å or more and 7.6240 Å or less on the c-axis.

3. The adhesive layer according to claim 1, wherein the composite tungsten oxide fine particles are represented by a general formula $M_xW_yO_z$ in which
the M is one or more elements selected from the group consisting of H, He, alkali metal, alkaline earth metal, rare earth element, Mg, Zr, Cr, Mn, Fe, Ru, Co, Rh, Jr, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb,
the W is tungsten,
the O is oxygen, and
the general formula $M_xW_yO_z$ satisfies $0.001 \leq x/y \leq 1$ and $2.0 \leq z/y \leq 3.0$.

4. The adhesive layer according to claim 1, wherein the composite tungsten oxide fine particles include a composite tungsten oxide having a hexagonal crystal structure.

5. The adhesive layer according to claim 1, wherein the average particle size of the composite tungsten oxide fine particles is 10 nm or more and 100 nm or less.

6. The adhesive layer according to any one of claim 1, wherein a crystallite size of the composite tungsten oxide fine particles is 10 nm or more and 100 nm or less.

7. The adhesive layer according to claim 1, wherein at least a part of a surface of the composite tungsten oxide fine particles is coated with a surface coating layer containing at least one element selected from Si, Ti, Zr, and Al.

8. The adhesive layer according to claim 7, wherein the surface coating layer contains oxygen atoms.

9. The adhesive layer according to claim 1, wherein the metal coupling agent having an amino group is contained at a ratio of 1 part by mass or more and 100 parts by mass or less, based on 100 parts by mass of the composite tungsten oxide fine particles.

10. The adhesive layer according to claim 1, wherein the metal coupling agent having an amino group is a silane coupling agent having an amino group.

11. The adhesive layer according to claim 1, wherein the metal coupling agent having an amino group is a titanate-based coupling agent having an amino group.

12. The adhesive layer according to claim 1, wherein the adhesive contains an acrylic polymer.

13. The adhesive layer according to claim 1, wherein the dispersant is a polymer dispersant.

14. The adhesive layer according to claim 1, further containing one or more kinds selected from the group consisting of ultraviolet absorbers, hindered amine light stabilizers (HALS), and antioxidants.

15. A near-infrared absorbing film including the adhesive layer according to claim 1.

16. A near-infrared absorbing film, wherein the adhesive layer according to claim 1 is disposed on one surface side of a transparent film, and a hard coat layer is disposed on the other surface side of the transparent film.

17. A laminated structure, including:
multiple transparent films; and
the adhesive layer according to claim 1,
wherein the adhesive layer is disposed between the multiple transparent films.

18. A laminated structure, including:
a glass plate disposed on one surface of the adhesive layer according to claim 1;
a transparent film disposed on the other surface of the adhesive layer; and
a hard coat layer disposed on the other surface of the transparent film.

19. An adhesive composition containing composite tungsten oxide fine particles, a dispersant, a metal coupling agent having an amino group, an organic solvent, an adhesive, and a crosslinking agent, wherein
the composite tungsten oxide fine particles having lattice constant values of 7.3850 Å or more and 7.4186 Å or less on a-axis, and 7.5600 Å or more and 7.6240 Å or less on c-axis,
the composite tungsten oxide fine particles having an average particle size of 100 nm or less, and the lattice constant values and the average particle size are values after pulverizing the composite tungsten oxide fine particles.

20. The adhesive composition according to claim 19, wherein the lattice constant values of the composite tungsten oxide fine particles is 7.4031 Å or more and 7.4111 Å or less on the a-axis, and 7.5891 Å or more and 7.6240 Å or less on the c-axis.

21. The adhesive composition according to claim 19, further containing one or more selected from the group consisting of UV absorber, HALS and antioxidant.

22. A method for producing an adhesive composition containing composite tungsten oxide fine particles, a dispersant, a metal coupling agent having an amino group, an organic solvent, an adhesive, and a crosslinking agent, the method including:
heat-treating and pulverizing to produce the composite tungsten oxide fine particles to have a lattice constant in a range of 7.3850 Å or more and 7.4186 Å or less on a-axis, and 7.5600 Å or more and 7.6240 Å or less on c-axis; and
mixing the produced composite tungsten oxide fine particles, the dispersant, the metal coupling agent having an amino group, the organic solvent, the adhesive, and the crosslinking agent while maintaining the above-described range of the lattice constant in the composite tungsten oxide fine particles, to obtain the adhesive composition.

23. The method for producing the adhesive composition according to claim 22, wherein the composite tungsten oxide fine particles are fine particles of composite tungsten oxide including a hexagonal crystal structure represented by $M_xW_yO_z$ in which
the M is one or more elements selected from the group consisting of H, He, alkali metal, alkaline earth metal, rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi, I, and Yb,
the W is tungsten,
the O is oxygen, and
the general formula $M_xW_yO_z$ satisfies $0.001 \leq x/y \leq 1$ and $2.2 \leq z/y \leq 3.0$.

24. The method for producing the adhesive composition according to claim 22, wherein at least a part of a surface of the composite tungsten oxide fine particles is coated with a surface coating layer containing at least one element selected from Si, Ti, Al and Zr.

25. The method for producing the adhesive composition according to claim 24, wherein the surface coating layer contains oxygen atoms.

26. The method for producing the adhesive composition according to claim 22, including:
further mixing at least one selected from the group consisting of UV absorber, HALS and antioxidant.

* * * * *